United States Patent [19]

Higuchi et al.

[11] Patent Number: 4,907,256
[45] Date of Patent: Mar. 6, 1990

[54] EXCHANGE SYSTEM HAVING ORIGINATING CALL RESTRICTION FUNCTION

[75] Inventors: Mamoru Higuchi, Yamato; Tatsuo Sunouchi, Yokohama; Kanji Higuchi, Kawasaki; Hiroshi Saito, Yokohama; Minoru Maruyama, both of Yokohama, all of Japan

[73] Assignee: Fujitsu Limited, Kanasaki, Japan

[21] Appl. No.: 343,612

[22] Filed: Apr. 27, 1989

[30] Foreign Application Priority Data

Apr. 30, 1988 [JP] Japan .................................. 63-108200
Jun. 17, 1988 [JP] Japan .................................. 63-149812
Jun. 17, 1988 [JP] Japan .................................. 63-149813

[51] Int. Cl.$^4$ ........................................... H04M 15/00
[52] U.S. Cl. .................................... 379/137; 379/113; 379/197
[58] Field of Search ............... 379/197, 220, 221, 112, 379/113, 121, 124, 137, 134, 139, 195

[56] References Cited

U.S. PATENT DOCUMENTS 4,199,665 4/1980 Emrick et al. ...................... 379/137
4,626,625 12/1986 Daisenberger ...................... 379/137

OTHER PUBLICATIONS

L. Burkard et al., Customer Behavior and Unexpected Dial Tone Delay, 10th International Traffic Conference, Session 2.4 paper #5.

Primary Examiner—James L. Dwyer
Attorney, Agent, or Firm—Staas & Halsey

[57] ABSTRACT

Disclosed is an exchange system having an originating call restriction function comprising a unit for counting originating calls, a unit for counting incoming calls, a storage unit for storing a number ($N_o$) or originating calls that can be accepted from accommodated subscribers (111) within a predetermined period, storage unit for storing a number ($N_i$) of incoming calls that can be accepted within a predetermined period, and a unit for correcting the number of calls that can be accepted. The correction of the number of calls that can be accepted is effected by comparing the number ($N_i$) of incoming calls that can be accepted and a number ($N_{ai}$) of accepted incoming calls. When the difference between the number ($N_i$) of incoming calls that can be accepted and the number ($N_{ai}$) of accepted incoming calls is decreased below a predetermined value, the number ($N_o$) of originating calls that can be accepted is decreased by a predetermined correcting value ($\alpha$), and the number ($N_i$) of incoming calls that can be accepted is increased by the correcting value ($\alpha$), Whereby, when there is processing congestion, the incoming call restriction level is relaxed and the originating call restriction level is increased.

23 Claims, 23 Drawing Sheets

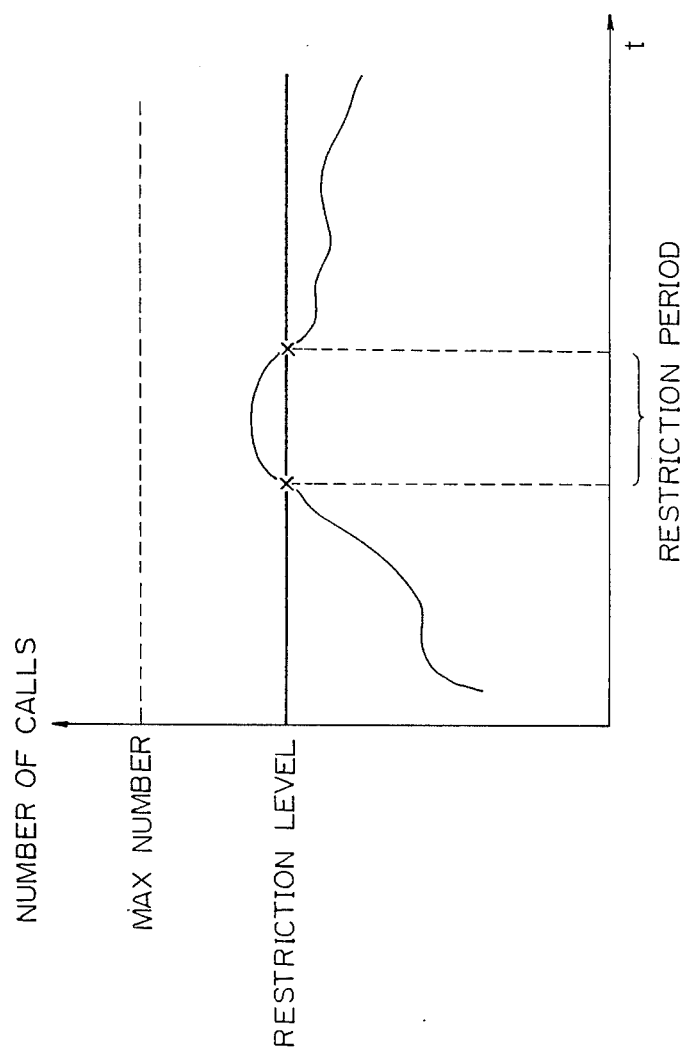

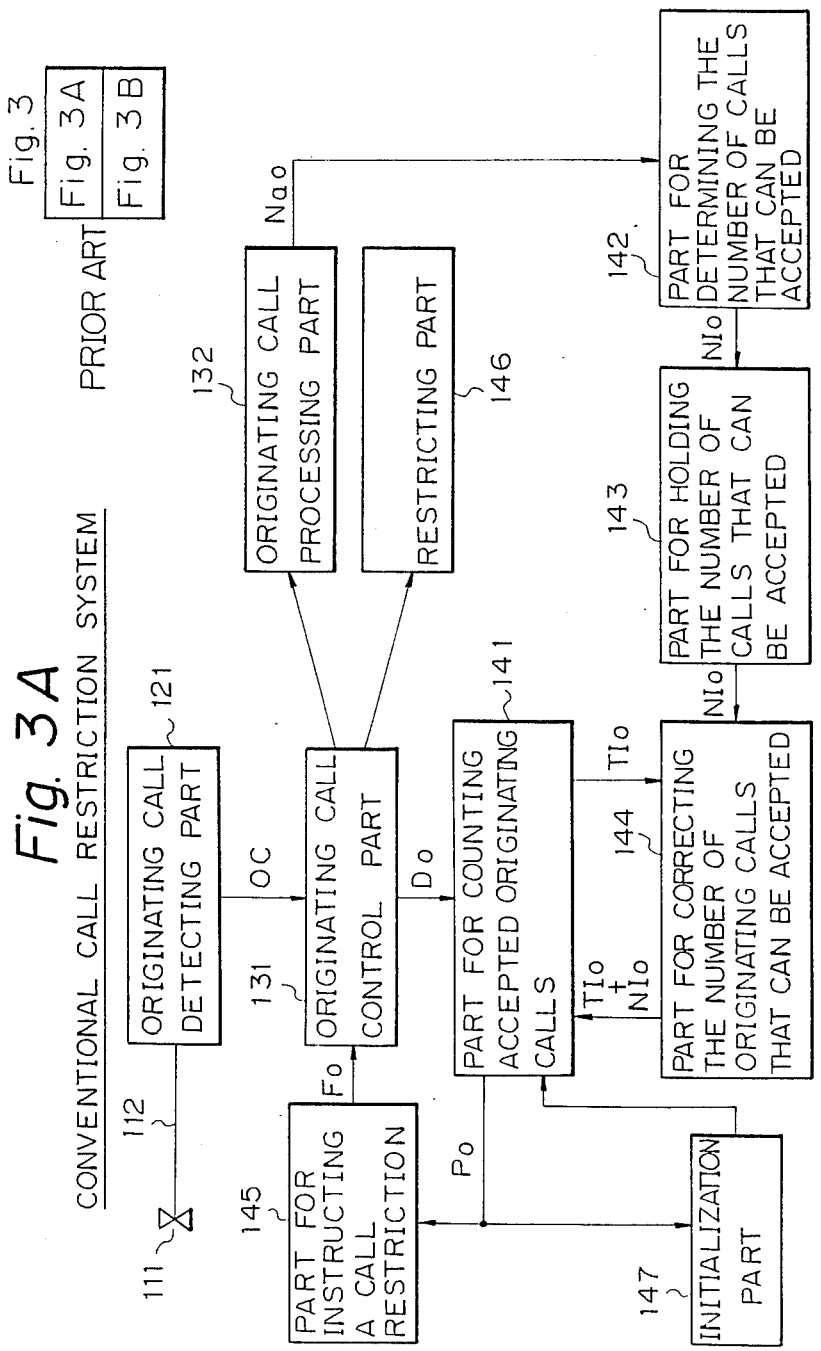
Fig. 3A CONVENTIONAL CALL RESTRICTION SYSTEM PRIOR ART

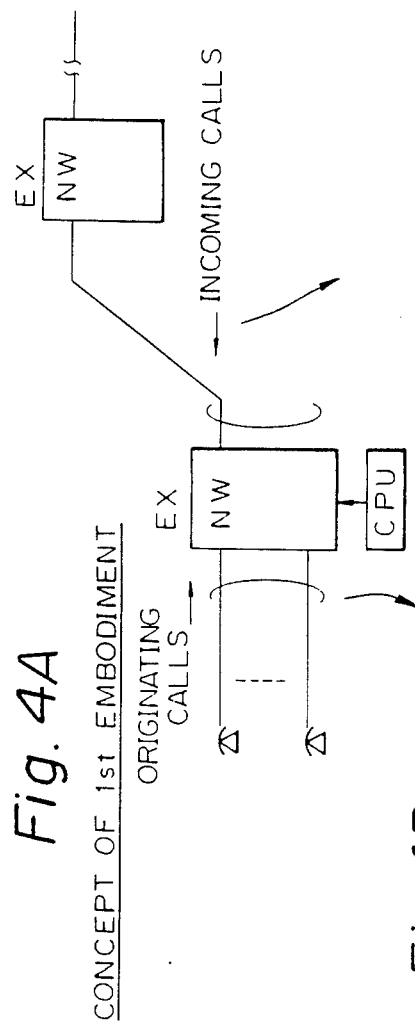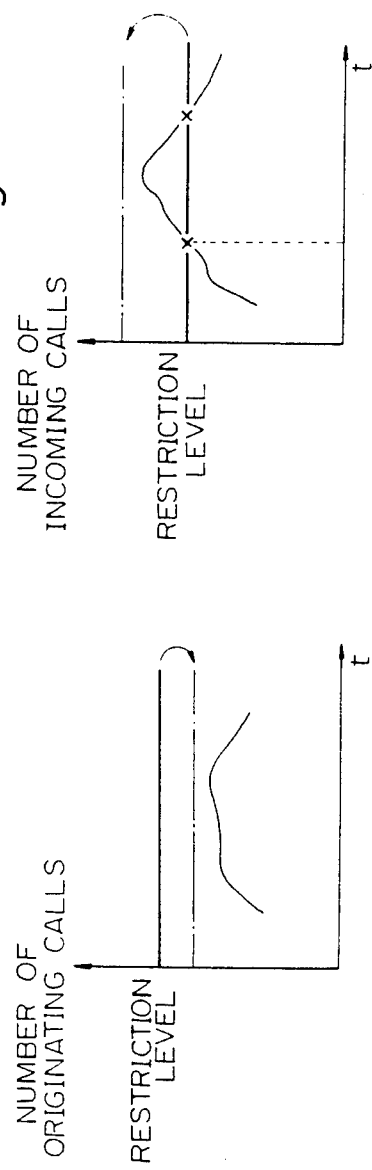

PRINCIPLE OF 1st EMBODIMENT

PRINCIPLE OF 2nd EMBODIMENT

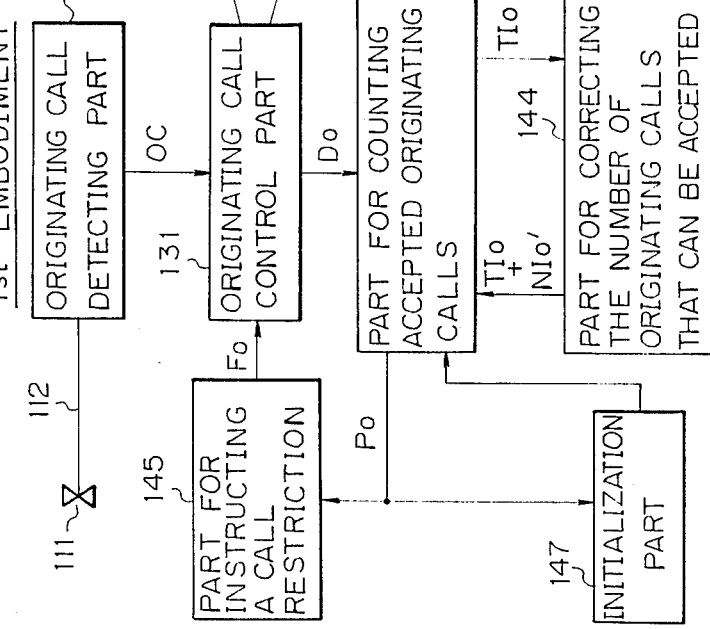

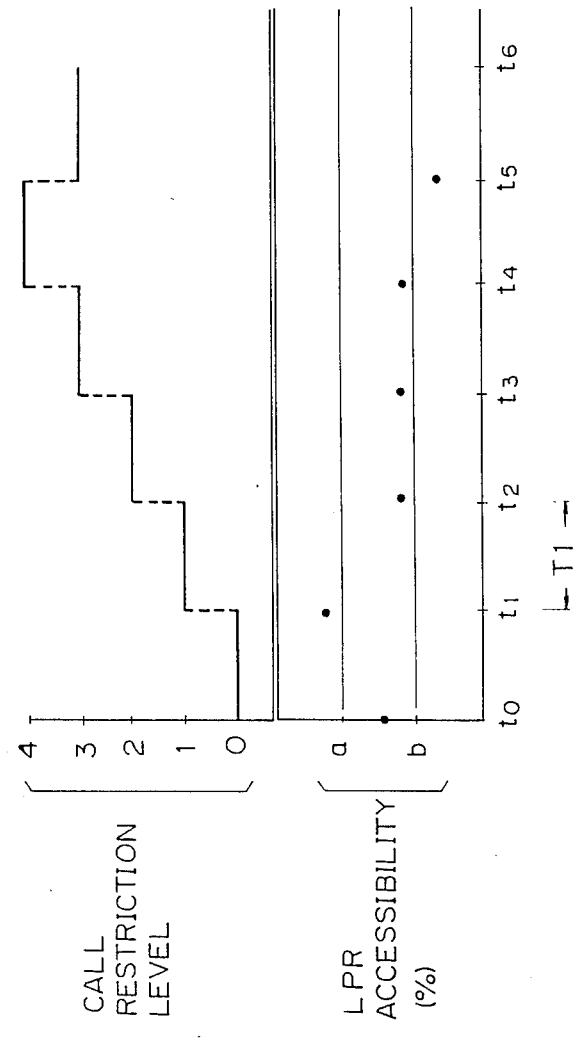

Fig. 9
DATA USED IN THE RESTRICTING PROCESS FOR EACH CALL IN 2nd EMBODIMENT
COUNTER FOR THE NUMBER OF ORIGINATING CALLS ~91
CALL RESTRICTION LEVEL POINTER ~92
$i$
CALL RESTRICTION PERIOD POINTER ~93
$j$
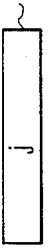
CALL RESTRICTION TABLE 94
| CALL RESTRICTION LEVEL $i$ | | | | | | | | | | | | |
|---|---|---|---|---|---|---|---|---|---|---|---|---|
| 4 | 1 | 1 | 1 | 0 | 0 | 0 | 0 | 0 | 0 | 0 | 0 | 0 |
| 3 | 1 | 0 | 0 | 0 | 0 | 0 | 1 | 0 | 0 | 0 | 1 | 0 |
| 2 | 1 | 1 | 1 | 1 | 1 | 1 | 1 | 1 | 1 | 1 | 1 | 1 |
| 1 | 2 | 2 | 2 | 2 | 2 | 2 | 2 | 2 | 2 | 2 | 2 | 2 |
| 0 | 5 | 5 | 5 | 5 | 5 | 5 | 5 | 5 | 5 | 5 | 5 | 5 |
|   | 1 | 2 | 3 | 4 | 5 | 6 | 7 | 8 | 9 | 10 |   |   |
$j \rightarrow$
CALL RESTRICTION PERIOD (T2=100msec)

CALL RESTRICTION LEVEL CONTROL PROCESS IN 2nd EMBODIMENT

RESTRICTION PROCESS FOR EACH CALL IN 2nd EMBODIMENT

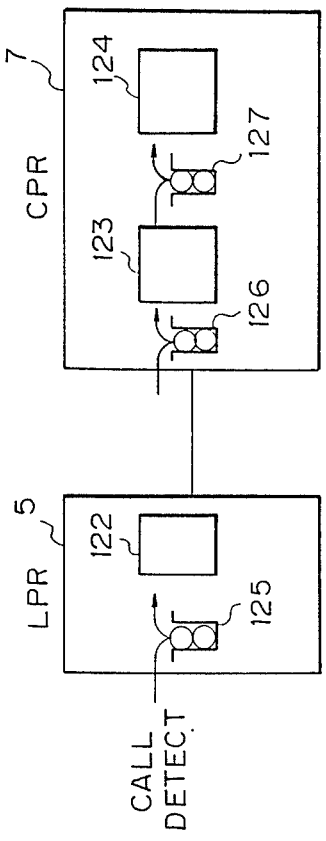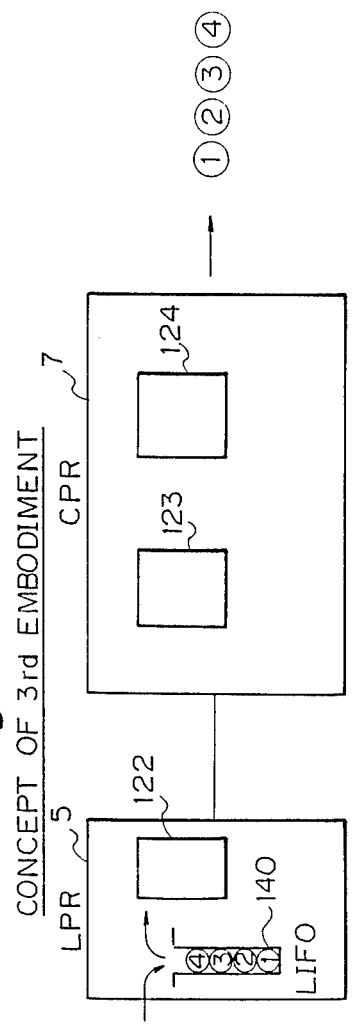

Fig. 17 CONTENTS OF TABLE

Fig. 19 TRANSITION OF CALL RESTRICTION LEVEL

STATE TRANSITIONS IN ORIGINATING CALL
CONTROL LEVEL DETERMINATION

EXCHANGE SYSTEM HAVING ORIGINATING CALL RESTRICTION FUNCTION

BACKGROUND OF THE INVENTION (1) Field of the Invention

The present invention relates to an exchange system having an originating call restriction function, and more particularly to a call restriction priority control system in an exchange for restricting originating calls from accommodated subscribers and incoming calls from other exchanges.

An exchange executes a desired exchange process for originating calls from accommodated subscribers and incoming calls from other exchanges connected through transmission lines. When these originating calls or incoming calls increase to a quantity more than a previously estimated quantity, the exchange falls into an overload state so that connecting times are increased and the rate of complete connections is lowered.

To prevent such lowering of exchange services, supervision of the load on the exchange has been conducted so as to restrict originating calls from subscribers or to restrict acceptance of incoming calls from other exchanges.

Further, the present invention relates to a call restricting system for use in an abnormal congestion state in an exchange, and more particularly, relates to a call restricting system in which the number of originating calls which are subject to detection is adjusted in accordance with the level of the load.

During abnormal congestion in which loads are concentrated at the exchange, delays of dial tones, lack of receivers, etc., causes an increase of non-productive or ineffective processes so that the throughput of the exchange, i.e., the number of calls that can be processed within a predetermined period, is lowered.

When such an abnormal congestion occurs, it is required that the throughput be improved for as long as possible to improve the service.

The present invention also relates to an originating call restriction system in which the throughput of the system is improved by providing a LIFO (Last In First Out) queue common to the system for postponing a call.

In an electronic exchange system of a telephone or data exchange storage program system, the number of resources for exchange processes (call processing memory blocks, communication paths, signal receiving units, etc.) is limited. Therefore, when there is an overload, the throughput is lowered due to process delays depending on the congestion of the exchange processing resources.

It has been desired to provide an originating call restriction system which can improve the throughput for as long as possible, even during such congestion of the exchange processing resources.

(2) Description of the Related Art

As prior arts of exchange systems having a call restriction function, Japanese Unexamined Patent Publication No. 61-70844 and Japanese Unexamined Patent Publication No. 61-191153 are known.

The former reference (JPP 61-70844) discloses a call control system in an exchange in which the number of calls that can be accepted is corrected in accordance with the number of accepted calls.

The latter reference (JPP 61-191153) discloses a dynamic overload control system in an exchange, in which the number of calls that can be accepted is determined for respective kinds of calls and the respective kinds of calls are separately restricted in accordance with a comparison with the number of originating calls and the number of calls that can be accepted, respectively.

These references, however, do not distinguish originating calls from accommodated subscribers and incoming calls from other exchanges. The resources occupied by incoming calls from other exchanges, however, are much greater than those of the originating calls from the subscribers. Therefore, if the incoming calls are restricted, the resources which have been occupied up to that time become ineffective or on hold so that there was the worry that the efficiency of the communication would decrease.

Further, by the method in which a detection of a call from a subscriber is stopped when an abnormal congestion occurs as disclosed in the above references, the load on the exchange can be greatly decreased, however, since the calls from subscribers are not accepted at all for a predetermined period, services for subscribers are lowered.

Further, such a conventional system tends to effect an over restriction so that the ability of the exchange is suppressed without sufficient performance even when many communication requirements are present.

Conventionally, as a queue for postponing a call exchange resources are congested, a FIFO (First In First Out) queue is employed to postpone a call with respect to the individual resources (see, for example, 10th International Traffic Conference (ITC-10), Session 2.4, paper #5 "CUSTOMER BEHAVIOR AND UNEXPECTED DIAL TONE DELAY", and ITC-10, Session 5.2, paper #4 "PERFORMANCE ANALYSIS OF A NEW OVERLOAD STRATEGY"). Accordingly, in this case, the call which was queued first is processed first when the resource becomes free so that the postpone time for each call, i.e., the process delay time, is averaged.

In the dial tone connection process at the time of accepting an originating call, however, many subscribers tend to dial without confirming the dial tones transmitted from the exchange. Due to such behavior of the subscribers, the longer the delay of the dial tone transmission, the greater the probability the subscribers will dial before the dial tone is transmitted. Accordingly, the probability of partial dialing of a call in which only a part of the dial number can be received is increased so that incomplete calls are increased.

Such phenomena are conspicuous at a time of overload in which there are more originating calls than a calculated standard of installations. When the delay time of the dial tone becomes long, partial dialing is increased. When the processes cannot be effected because of the partial dialings, recalls are increased, and further a vicious cycle is caused by the delays of the dial tones and the increase of the partial dialings, resulting in an extremely bad system throughput (the ratio of the total calls to the completed calls).

SUMMARY OF THE INVENTION

An object of the present invention is to provide an exchange system having a call restriction function which can accept with priority incoming calls from other exchanges which occupy more resources than the originating calls from the subscribers.

Another object of the present invention is to provide a call restriction system which enables continuing call detections from subscribers by decreasing the loads of the exchange even when there is abnormal congestion of the exchange, whereby the services can be improved.

Still a further object of the present invention is to provide a system in which, in an electronic exchange system having a multiprocessor construction, the processes from an off-hook action by a subscriber to a dial tone connection, when there is congestion of various resources for exchange processes, can be effected in the LIFO sequence.

There is provided, according to the present invention, an exchange system having an originating call restriction function for restricting originating calls when the number of originating calls exceeds a predetermined process restricting level within a predetermined period. The system comprises a unit for counting originating calls, a unit for counting incoming calls, a storage unit for storing a number of originating calls that can be accepted from accommodated subscribers within a predetermined period, a storage unit for storing a number of incoming calls that can be accepted within a predetermined period, and a unit for correcting the number of calls that can be accepted. By comparing the number of incoming calls that can be accepted with a number of accepted incoming calls, and when the difference between the number of incoming calls that can be accepted and the number of accepted incoming calls is decreased below a predetermined level, the number of originating calls that can be accepted is decreased by a predetermined correction value, and the number of incoming calls that can be accepted is increased by the correction value. Whereby, at the time of congestion of processings, the incoming call restriction level is relaxed and the originating call restriction level is increased.

The incoming calls are those coming from other offices through communication lines.

The congestion of processes is determined by the number of calls, and by the processing ability of a control unit in the exchange.

The restriction of the originating calls is controlled step by step in accordance with the processing ability of the exchange.

A plurality of originating restriction levels are provided and the control of the originating call restriction is carried out by the use of the plurality of levels.

There are two restriction levels, and once a restriction process is started, the restriction is continued to the lower restriction level. The number of originating calls that can be accepted is variable in accordance with the restriction level.

When the number of counted originating calls exceeds a predetermined restriction level, the restriction level is raised step by step, and when the number of counted originating calls decreases to be lower than the predetermined level, the restriction level is lowered step by step.

The originating call restriction and the incoming call restriction are carried on the basis of priority.

The originating call detection processing part comprises an LIFO unit, whereby the originating calls are queued in the queue of the LIFO unit.

When resources are congested, taking out of calls from the LIFO unit is stopped and the restriction level is raised by one. When the resources are congested again, taking out of calls from the LIFO unit is again stopped and the restriction level is again raised by one, and this process is sequentially carried out up to N levels.

According to another aspect of the present invention, there is provided an exchange system having an originating call restriction function in an exchange for determining a number of accepted originating calls that can be originated from accommodated subscribers within a predetermined period, and a number of accepted incoming calls that can be incoming within a predetermined period from other exchanges connected through transmission lines. When a number of originating calls accepted within a predetermined period from the subscribers increases to more than the number of accepted originating calls that can be originated, the calls from the subscribers are restricted, and when a number of accepted incoming calls within a predetermined period from other exchanges increases to more than the number of incoming calls that can be accepted, the calls received from the other exchanges are restricted. A call number correcting unit is provided whereby the number of incoming calls that can be accepted is compared with the number of accepted incoming calls. When the difference between the number of incoming calls that can be accepted and the number of incoming calls is decreased below a predetermined value, the number of allowable accepted calls is decreased by a predetermined correction call number, and the number of receiving calls allowable to be accepted is increased by the correction call number.

According to a further aspect of the present invention, the system comprises a multiprocessor construction having processors in a line concentration stage and in a line distribution stage, respectively. The system is provided with a LIFO queue for postponing a call in the processor in the line concentration stage, and an originating call number control table for determining the number of originating calls that are allowable within a predetermined period. The taking out of an originating requirement from the LIFO queue is stopped for a predetermined time when there is congestion of exchange processing resources. The number of call requirements taken out from the LIFO queue is increased step by step in accordance with control levels in the originating call number control table after the predetermined time.

BRIEF DESCRIPTION OF THE DRAWINGS

FIG. 2 is a graph showing a conventional call restriction method;

FIGS. 3A and 3B are diagrams showing an example of a conventional call restriction system;

FIG. 4 is a diagram explaining the principal concept of a first embodiment of the present invention;

FIGS. 6A and 6B are diagrams showing an exchange system according to the first embodiment of the present invention;

FIG. 8 is a diagram showing an example of the over all restriction level control according to the second embodiment of the present invention;

FIG. 9 is a diagram showing data used in the call restricting process for each call according to the second embodiment of the present invention;

FIG. 12 is a diagram showing a conventional construction of LIFO queues provided to correspond to various resources, respectively;

FIG. 14 is a diagram showing the principal concept of the third embodiment of the present invention;

FIG. 19 is a diagram explaining transitions of call restriction level in the third embodiment;

DESCRIPTION OF THE PREFERRED EMBODIMENTS

For better understanding of the present invention, the background and the prior arts will first be described with reference to FIGS. 1 to 3.

Figure 1:
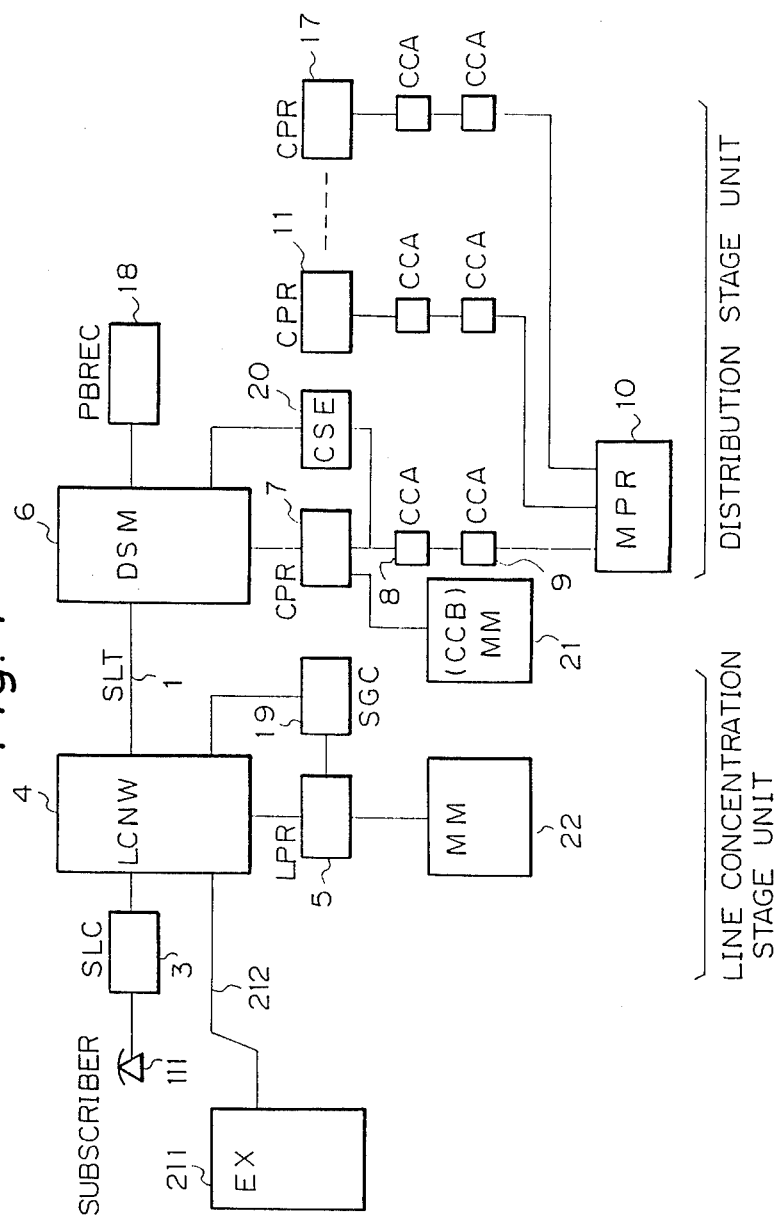
FIG. 1 is a diagram showing a switching system as a background of the present invention.

FIG. 1 is a diagram showing a switching system as a background of the present invention. In FIG. 1, a line concentration stage unit and a distribution stage unit in an electronic exchange system are shown. The line concentration stage unit and the distribution unit are connected through a communication channel (SLT) 1.

In the line concentration stage unit, a subscriber 2 is connected through a subscriber line circuit (SLC) 3 to a line concentration stage switch network (LCNW) 4, and from the LCNW 4 through the SLT 1 to the distribution stage unit. Also, a line concentration stage processor (LPR) 5 is connected to the LCNW 4.

In the distribution stage unit, the SLT 1 is connected to a distribution stage switching network (DSM) 6, and a call processing processor (CPR) 7 is connected to the DSM 6. The CPR 7 is connected through channel coupling units 8 and 9 to a main processor (MPR) 10. A plurality of other processors (CPR) 11 through 17 have the same construction as the CPR 7 and are connected to the main processor (MPR) to construct a multiprocessor system. Further, a Push Button (PB) signal receiving unit (PBREC) 18 is connected to the DSM 6.

Also, in the line concentration stage unit, a unit (SGC) 19 for controlling communication between the LPR 5 and one of the CPRs 7, 11 through 17 is connected to the LPR 5 and the LCNW 4. In the distribution stage unit, a unit (CSE) 20 for controlling communication between the LPR 5 and the CPR 7 is connected to the CPR 7 and the DSM 6, so as to effect mutual communication processes.

A main memory (MM) 21 including distribution stage call control memory blocks (CCB) is connected to the CPR 7.

Another exchange (EX) 211 is connected through a transmission line 212 to the LCMNW 4.

FIG. 2 is a graph showing a conventional call restriction method. In FIG. 2, the horizontal axis represents time, and the vertical axis represents the number of calls accepted by the exchange system. As shown in FIG. 2, conventionally, when the number of calls exceeds a predetermined restriction level, the calls reached to the exchange are restricted to be accepted to the exchange for further processing. The period during which the number of reached calls exceeds the predetermined restriction level is the restriction period.

To realize the call restriction shown in FIG. 2, conventionally, originating calls from subscribers accommodated to the exchange under consideration and incoming calls from other exchanges are restricted independently. This conventional call restriction is described with reference to FIG. 3.

Figure 3B:
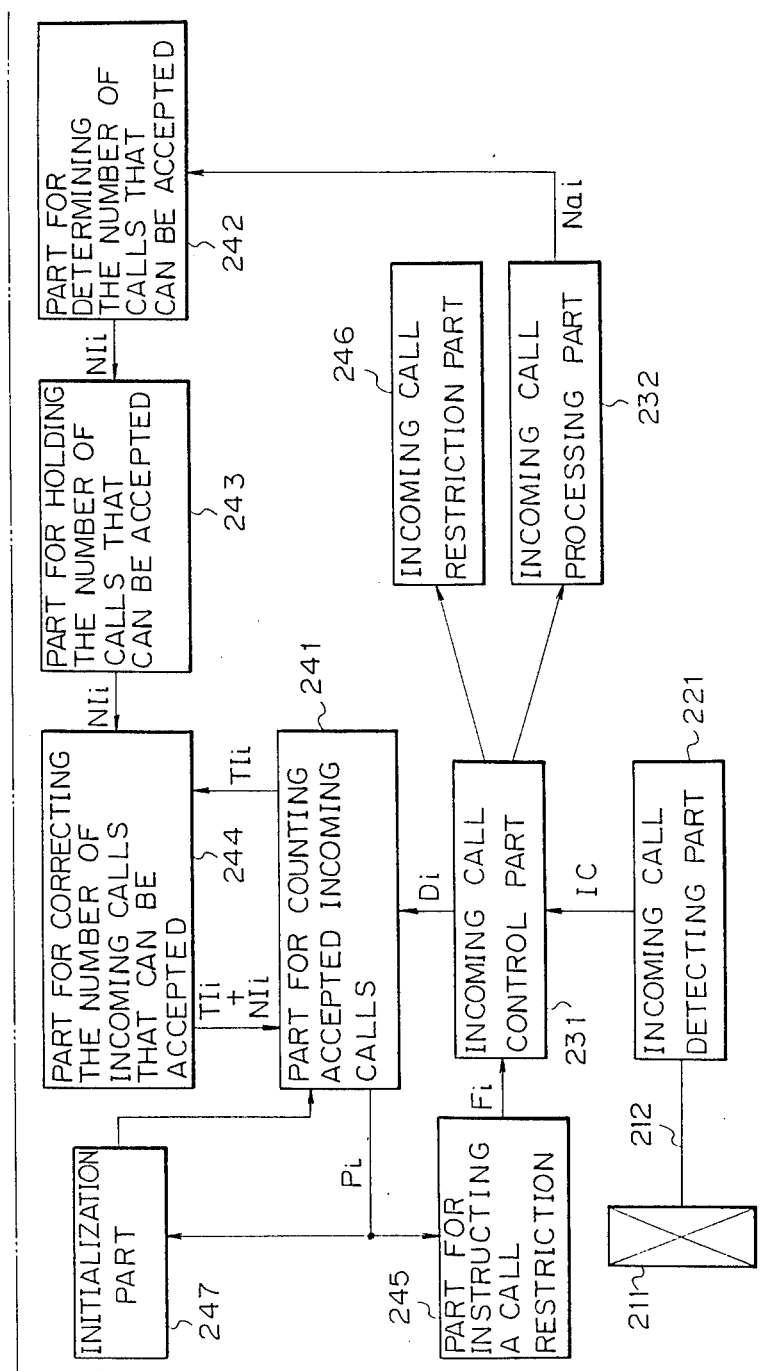

FIG. 3 is a diagram showing an example of a conventional call restricting system.

This conventional call restricting system is described in Japanese Unexamined Patent Publication No 61-70844 filed on Sept. 14, 1984, by the same applicant and published on Apr. 11, 1986.

In FIG. 3, when a subscriber 111 accommodated through a subscriber line 112 make a call, an originating call detecting part 121, for example, provided in an interface part accommodating the subscriber lines to the exchange, detects the call and transmits a calling signal OC to an originating call control part 131 to report the call from the subscriber 111.

The originating call control part 131, which has received the call signal OC, drives an originating call processing part 132 when the exchange determines that the call can be accepted through a later described process so as to effect the acceptance process of the call detected by the originating call detecting part 121, and transmits a subtracting signal $D_o$ to a part 141 for counting accepted originating calls.

On the other hand, a part 142 for determining the number of calls that can be accepted calculates the number of originating calls $NI_o$ that can be accepted within a predetermined period by the originating call processing part 132, based on the number of the originating calls $N_{ao}$ accepted and processed by the originating call processing part 132 within a predetermined period (for example one second), and the accessing ratio, etc., of the part handling the above-mentioned call processing, and transmits it, through a part 143 for holding the number of calls that can be accepted, to a part 144 for correcting the number of originating calls that can be accepted.

The part 144 for correcting the number of originating calls that can be accepted extracts an originating count value $TI_o$ kept by the part 141 for counting accepted originating calls and sets, at the part 141 for counting accepted originating calls, a summed value ($TI_o + NI_o$) summed with the number of the transmitted originating calls $NI_o$ that can be accepted.

Note that, in the initial state, since the originating count value $TI_o$ in the part 141 for counting accepted originating calls is set to zero, the calculated value $TI_o$ is equal to the number of the originating calls $NI_o$ due to the setting of the summed value ($TI_o + NI_o$).

The part 141 for counting accepted originating calls subtracts 1 from the originating count value $TI_o$ every time the subtracting signal $D_o$ is transmitted from the originating call control part 131.

The part 141 for counting accepted originating calls supervises whether the originating count value $TI_o$ is positive or negative, and outputs the supervising result as a positive/negative indicating signal $P_o$ which is transmitted to a part 145 for instruction a call restriction and initialization part 147.

The part 145 for instructing a call restriction transmits a call restriction flag $F_o$ to the originating call control part 131 when the positive/negative indicating signal $P_o$ transmitted from the part 141 for counting the accepted originating calls indicates a negative state, and stops transmission of the call restriction flag $F_o$ when the positive/negative indicating signal $P_o$ indicates a positive state.

When a calling signal OC is transmitted to the originating call control part 131 during a state at which the call restricting flag $F_o$ is transmitted from the part 145 for instructing a call restriction, the originating call control part 131 drives an incoming call restricting part 146 in place of the originating call processing part 132 so that a call from the subscriber 111 is restricted without being accepted.

After a predetermined period (for example one second) has passed in the above-described state, the part 144 for correcting the number of originating calls that can be accepted sets the summed value ($TI_o + NI_o$) obtained from the originating count value $TI_o$ at this time in the part for counting the accepted originating calls and the transmitted number of originating calls $NI_o$ that can be accepted.

Accordingly, when the number of originating calls from the subscriber 111 is small in the previous period so that the originating count value $TI_o$ is more than 1, the number of calls that can be accepted without restriction in the next period is increased, and when the number of originating calls from the subscriber 111 is large in the previous period so that the originating count value $TI_o$ is a negative value, the number of originating calls that can be accepted without restriction in the next period is decreased.

Note that, in order to prevent a continuous increase of the summed value ($TI_o + NI_o$), when periods continue in which the number of calls from the subscriber 111 is small, an initialization part 147 initializes the part 141 for counting accepted originating calls so as to set the originating count value $TI_o$ to zero at predetermined periods (for example 10 seconds) and upon he recognition that the positive/negative indicating signal $P_o$ indicates the positive state.

On the other hand, when a call is terminated from another exchange 211 connected through a transmission line 212, an incoming call detecting part 221, provided for example in an interface part for accommodating the transmission line to the exchange, detects the incoming call and transmits an incoming call signal IC to an incoming call control part 231 provided in a part for processing calls in the exchange so as to report the incoming call from the other exchange 211.

The incoming call control part 231, which received the incoming call IC, drives an incoming call processing part 232 when it is determined that the exchange is able to accept the incoming call through a later described process, so as to accept and process the incoming call detected by the incoming call detecting part 221, as well as to transmit a subtracting signal $D_i$ to a part 241 for counting the accepted incoming calls.

On the other hand, a part 242 for determining the number of calls that can be accepted calculates the number $NI_i$ of incoming calls that can be accepted by an incoming call processing part 232 within a predetermined period, and transmits it through a part 243 for holding the number of calls that can be accepted.

A part 244 for correcting the number of accepted incoming calls extracts the incoming count value $TI_i$ held in the part 241 for counting the number of accepted incoming calls, and sets the summed value ($TI_i + NI_i$), obtained by adding the transmitted number $NI_i$ of incoming calls that can be accepted, in the part 241 for counting the number of accepted incoming calls.

The part 241 for counting the accepted incoming calls subtracts one from the incoming count value $TI_i$ every time the subtracting signal $D_i$ is transmitted from the incoming call control part 231.

The part 241 for counting the accepted incoming calls supervises whether the incoming count value $TI_i$ is positive or negative, and outputs the supervision result as a positive/negative indicating signal $P_i$ which is transmitted to a part 245 for instructing the call restriction.

When the positive/negative indicating signal $P_i$ transmitted from the part 241 for counting the number of accepted incoming calls represents a negative state, a part 245 for instructing restriction of incoming calls transmits an incoming call restriction flag $F_i$ to the incoming call control part 231, and when the positive/negative indication signal $P_i$ represents a positive state, the transmission of the incoming call restriction flag $F_i$ is stopped.

When an incoming call signal IC is transmitted to the incoming call control part 231 during the state in which the incoming call restriction flag $F_i$ is transmitted from the part 245 for instructing restriction of incoming calls, the incoming call control part 231 drives a part 246 for restricting incoming calls instead of driving the incoming call processing part 232 in accordance with the condition of another exchange 211 so as to restrict the incoming calls from the other exchange 211 not to be accepted.

In the above-described state, when a predetermined period (for example, one second) has passed, the part 244 for correcting the number of accepted incoming calls sets the summed value ($TI_i + NI_i$) obtained from the incoming count value $TI_i$ at the present time point in the part 241 for counting the number of accepted incoming calls and the number $NI_i$ of incoming calls that can be accepted, in the part 241 for counting the number of accepted incoming calls.

Accordingly, when the number of the incoming calls from another exchange 211 is small in the previous period so that the incoming count value $TI_i$ is more than 1, the number of originating calls that can be accepted without restriction in the next period is increased, and when the number of incoming calls from the another exchange 211 is large in the previous period so that the incoming count value $TI_i$ is a negative value, the number of incoming calls that can be accepted without restriction in the next period is decreased.

Note that, in order to prevent a continuous increase of the summed value $(TI_i+NI_i)$, when periods continue in which the number of incoming calls from the another exchange 211 is small, an initialization part 247 initializes the part 241 for counting accepted incoming calls so as to set the incoming count value $TI_i$ to zero at predetermined periods (for example 10 seconds) and upon the recognition that the positive/negative indicating signal $P_i$ indicates the positive state. As will be apparent from the foregoing description with reference to FIG. 3, in the conventional call restriction system, originating calls from the subscriber 111 and incoming calls from another exchange 211 are restricted independently by the same system, and a specific priority was not given for accepting incoming calls.

The resources occupied by incoming calls from another exchange 211, however, are much greater than those of the originating calls from the subscriber 111. Namely, the incoming calls from another exchange 211 already occupy a large number of resources in the other exchange, and by contrast, the originating calls from the subscribers do not occupy so many resources in their own exchange accommodating the subscribers because the originating calls are not yet transmitted from the exchange. Therefore, if the incoming calls are restricted, the resources which have been occupied up to that time become ineffective or on holding so that there was the worry that the efficiency of the communication network would decrease.

First Embodiment

Next, the first embodiment of the present invention will be described with reference to FIGS. 4 to 6.

FIG. 4 is a diagram showing the principal concept of the first embodiment of the present invention.

As will be seen from FIG. 4, according to the first embodiment of the present invention, under certain conditions, the restriction level for the originating calls is lowered and simultaneously the restriction level of the incoming calls is raised. Since the restriction level for the incoming calls is raised, the number of restricted incoming calls is decreased while the total number of restricted calls is not increased. Therefore, most of the resources occupied by the incoming calls do not become to be ineffective holding.

Figure 5:
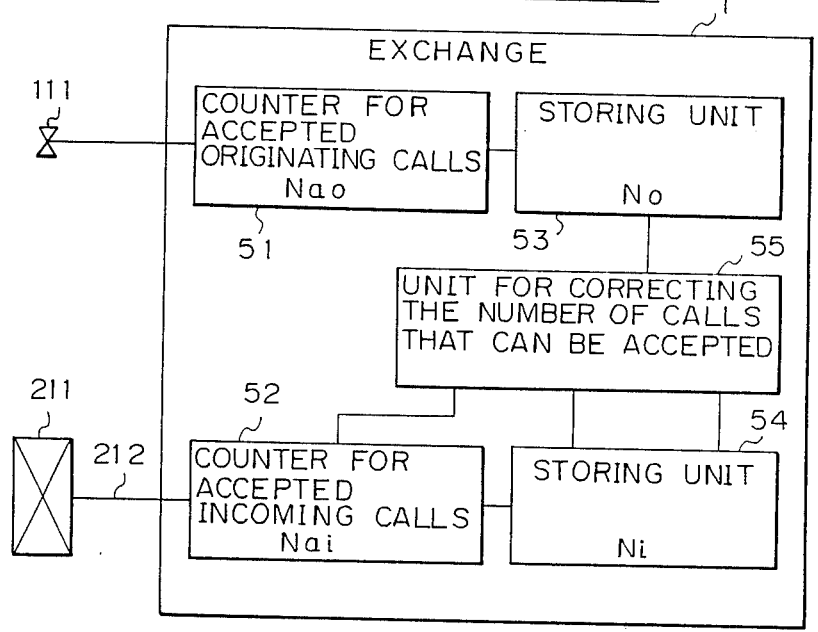
FIG. 5 is a diagram showing the principal construction of an exchange system according to the first embodiment of the present invention.

FIG. 5 is a diagram showing the principle construction of the exchange system according to the first embodiment of the present invention.

In FIG. 5, 1 is an exchange, 111 is a subscriber accommodated by the exchange 1, and 211 is another exchange connected through a transmission line 212 to the exchange 1.

51 is a counter for counting the number $N_{ao}$ of originating calls originated from the subscriber 111 within a predetermined period and accepted by the exchange 1. 52 is a counter for counting the number $N_{ai}$ of incoming calls income from the other exchange 211 within a predetermined period and accepted by the exchange 1. 53 is a storage unit for storing the number $N_o$ of the originating calls that can be accepted for origination by the subscriber 111 within a predetermined period. 54 is a storage unit for storing the number $N_i$ of incoming calls that can be accepted from the other exchange 211. 55 is a unit provided in the exchange 1 according to the present invention for correcting the number of calls that can be accepted.

When the number $N_{ao}$ of accepted originating calls increases over the number $N_o$ of originating calls that can be accepted, the calls from the subscriber 111 are restricted, and when the number $N_{ai}$ of accepted incoming calls increases over the number $N_i$ of incoming calls that can be accepted, the incoming calls from the other exchange 211 are restricted.

The unit 55 for correcting the number of calls that can be accepted compares the number $N_i$ of incoming calls that can be accepted with the number $N_{ai}$ of accepted incoming calls, and when the difference between the number $N_i$ of incoming calls that can be accepted and the number $N_{ai}$ of accepted incoming calls is decreases below a predetermined value, the number $N_o$ of originating calls that can be accepted is decreased by a predetermined correction call number $\alpha$, and the number $N_i$ of incoming calls that can be accepted is increased by the correction call number $\alpha$.

The correction call number $\alpha$ is determined depending on the condition of the exchange. For example, the number $\alpha$ is around 5% of the number of calls that can be accepted.

Accordingly, when the incoming calls from the other exchange 211 reach the state in which a restriction is necessary, a part of the number of originating calls that can be accepted is distributed to the number of incoming calls that can be accepted so that the incoming calls from other exchange 211 are accepted prior to the originating calls from the subscriber 111, resulting in an improvement of the efficiency in the communication network.

Figure 6B:
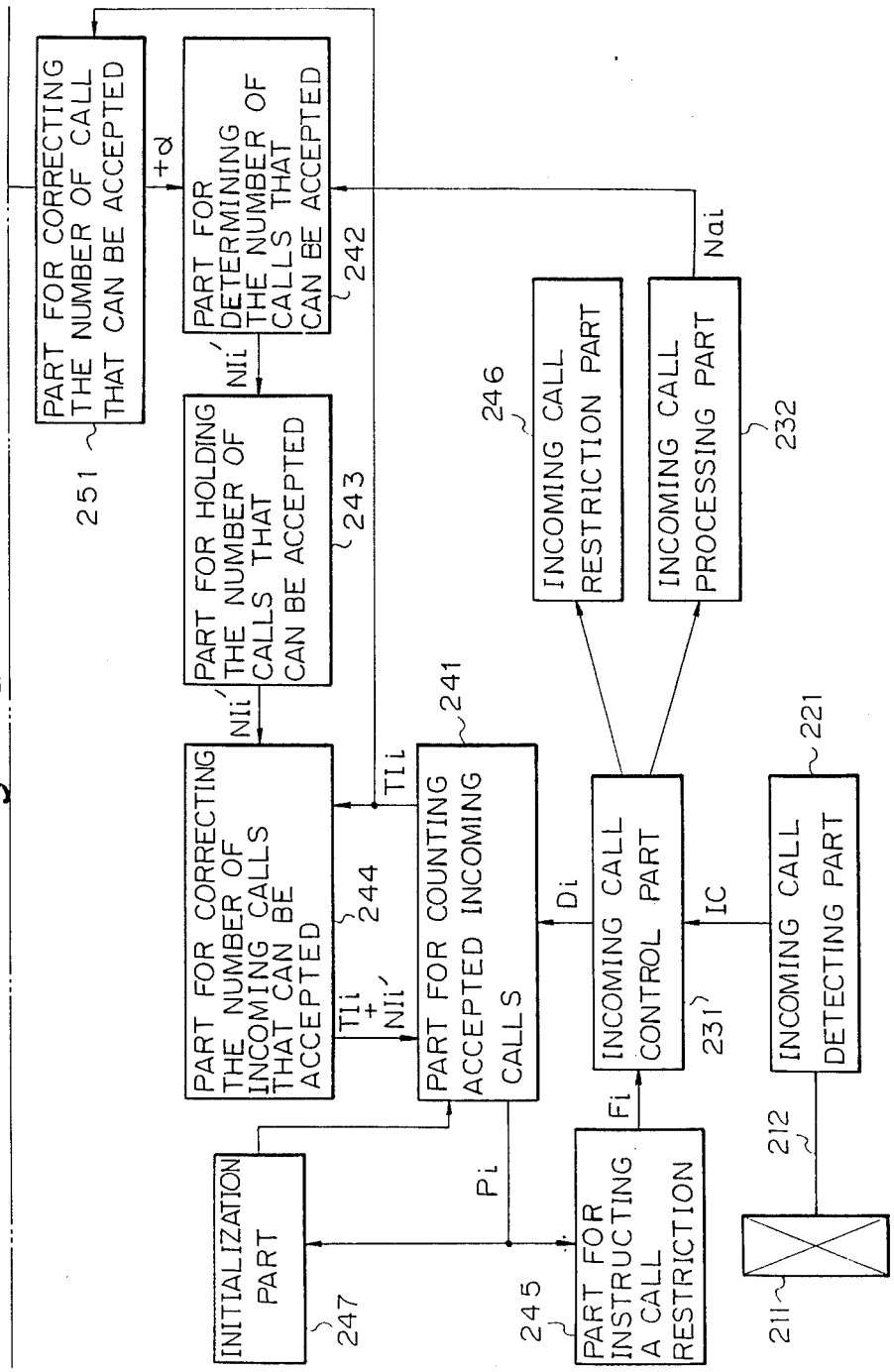

FIG. 6 is a diagram showing in detail the exchange system having an originating call restriction function, according to the first embodiment of the present invention. Throughout all the drawings, the same symbols represent the same parts.

In FIG. 6, as the unit 55 for correcting the number of calls that can be accepted, a part 251 is provided. The parts 121, 131, and 144 are included in the LPR 5 connected to the LCNW 4 shown in FIG. 1. The parts 132, 141, 142, 143, 145, 146, and 147 are included in the CPR 7 connected to the DSM 6 shown in FIG. 1. Similarly, the parts 221, 231, and 244 are included in the LPR 5 connected to the LCNW 4 shown in FIG. 1 and the parts 232, 241, 242, 243, 245, 246, and 247 are included in the CPR 7 connected to the DSM 6 shown in FIG. 1.

In FIG. 6, a call from the subscriber 111 is, in the same way as in FIG. 3, detected by the originating call detecting part 121, and is subject to call processing by the originating call control part 131 and the originating call processing part 132. Also, the restriction of calls from the subscriber 111 is, in the same way as in FIG. 3, carried out by the part 141 for counting accepted originating calls, the part 142 for determining the number of calls that can be accepted, the part 143 for holding the number of calls that can be accepted, the part 144 for correcting the number of originating calls that can be accepted, the part 145 for instructing a call restriction, the incoming call restricting part 146, and the initialization part 147.

On the other hand, when an incoming call is received from the other exchange 211 connected through the transmission line 212, the incoming call is, in the same way as in FIG. 3, detected by the incoming call detecting part 221 to transmit the incoming signal IC to the incoming call control part 231 to report the incoming call from the other exchange 211.

When the incoming call restriction flag $F_i$ from the part 245 for instructing the restriction of the incoming calls is not transmitted, the incoming call control part 231 which received the incoming signal IC drives the incoming call processing part 232 to process the acceptance of the incoming call detected by the incoming call detecting part 221 and to transmit a subtracting signal $D_i$ to the part 241 for counting the accepted incoming calls.

On the other hand, the part 242 for determining the number of calls that can be accepted calculates, in the same way as the part 242 in FIG. 3 for determining the number of calls that can be accepted, the number $NI_i$ of incoming calls that can be accepted by an incoming call processing part 232 within a predetermined period, and transmits it through a part 243 for holding the number of calls that can be accepted. The part 244 for correcting the number of accepted incoming calls extracts, in the same way as the part 244 for determining the number of accepted incoming calls in FIG. 3, the incoming count value $TI_i$ held in the part 241 for counting the number of accepted incoming calls, and sets the summed value $(TI_i + NI_i)$ obtained by adding the transmitted number $NI_i$ of incoming calls that can be accepted, in the part 241 for counting the number of accepted incoming calls.

Note that at the initial state, since the incoming count value $TI_i$ of the part 241 for counting the accepted incoming calls is set to zero, the incoming count value $TI_i$ set by the summed value $(TI_i + NI_i)$ is equal to the incoming calls that can be accepted.

The part 241 for counting the accepted incoming calls subtracts, in the same way as in FIG. 3, one from the incoming count value $TI_i$ every time the subtracting signal $D_i$ is transmitted from the incoming call control part 231.

The part 241 for counting the accepted incoming calls supervises, in the same way as in FIG. 3, whether the incoming count value $TI_i$ is positive or negative, and outputs the supervising result as a positive/negative indicating signal $P_i$ which is transmitted to a part 245 for instructing the incoming call restriction.

When the positive/negative indicating signal $P_i$ transmitted from the part 241 for counting the number of accepted incoming calls represents a negative state, the part 245 for instructing restriction of incoming calls transmits, in the same way as in FIG. 3, the incoming call restriction flag $F_i$ to the incoming call control part 231, and when the positive/negative indication signal $P_i$ represents a positive state, the transmission of the incoming call restriction flag $F_i$ is stopped. When the incoming call signal IC is transmitted to the incoming call control part 231 during the state in which the incoming call restriction flag $F_i$ is transmitted from the part 245 for instructing restriction of incoming calls, the incoming call control part 231 drives, in the same way as in FIG. 3, the part 246 for restricting incoming calls in place of driving the incoming call processing part 232 in accordance with the condition of the other exchange 211 so as to restrict the number of incoming calls from the other exchange 211 which can be accepted.

In the above-described state, when a predetermined period (for example, one second) has passed, the part 244 for correcting the number of accepted incoming calls sets, as described before, the summed value $(TI_i + NI_i)$ obtained from the incoming count value $TI_i$ at the present time point in the part 241 for counting the number of accepted incoming calls and the number $NI_i$ of incoming calls that can be accepted, in the part 241 for counting the number of accepted incoming calls.

Note that, the initialization part 247 initializes in the same way as in FIG. 3, the part 241 for counting accepted incoming calls so as to set the incoming count value $TI_i$ to zero at predetermined periods (for example 10 seconds) and upon the recognition that the positive/negative indicating signal $P_i$ indicates the positive state.

In the above process, the incoming count value $TI_{ii}$ in the current period represents the difference between the summed value $(TI_i + NI_i)$ an the number $N_{ai}$ in the previous period, where the number $NI_i$ is the number of incoming calls that can be accepted which is set by the part 244 for correcting the number of accepted incoming calls, the number $TI_i$ is the incoming count value at the end of the previous period, and the number $N_{ai}$ is the number of the accepted incoming calls which have been subject to the incoming process by the incoming call processing part 232 and accepted by the incoming call control part 231.

On the other hand, the part 251 for correcting the number of calls that can be accepted extracts the incoming count value $TI_i$ from the part 241 for counting the number of accepted incoming calls, and when the incoming count value $TI_i$ decreases below a predetermined value, it is determined that the incoming calls from the other exchange 211 are increased so that a restriction-necessary state is approached.

When the above-described state continues for a predetermined number of periods (for example three periods), the part 251 for correcting the number of calls that can be accepted subtracts a predetermined correcting number $\alpha$ of calls (for example about 5% of the number of originating calls that can be accepted) from the number of the accepted originating calls $NI_o$ which is calculated by the part 142 for determining the number of calls that can be accepted, and adds the correcting number $\alpha$ of calls to the number $NI_i$ of the incoming calls that can be accepted which is the incoming count value calculated by the part 242, for determining the number of calls that can be accepted.

After this, with respect to the originating calls from the subscriber 111, the necessity of the restriction is determined based on the number $NI_o'$ of originating calls that can be accepted which is decreased by the correcting number $\alpha$ of calls, and with respect to the incoming calls from the other exchange 211, the necessity of the restriction is determined based on the number $NI_i'$ of originating calls that can be accepted which is increased by the correcting number $\alpha$ of calls. As will be apparent from the above description, according to the present invention, when the part 251 for correcting the number of calls that can be accepted determines based on the incoming count value $TI_i$ that the restriction of the incoming calls from another exchange 211 is necessary, the number $NI_i'$ of incoming calls that can be accepted is increased by the correcting number $\alpha$ of calls so that the incoming calls from the other exchange 211 are accepted preferentially.

Simultaneously with this, by decreasing the number $NI_o'$ of originating calls that can be accepted by the correcting number $\alpha$ of calls, the increase of the accessibility of the part for treating the call processing can be avoided.

Note that FIG. 6 is only an embodiment of the present invention. For example, it is not restricted to independently providing the part 141 for counting the accepted originating calls through the initialization part 147 for restricting the originating calls from the subscriber 111, and the part 241 for counting the accepted incoming calls through the initialization part 247 for controlling the restriction of the incoming calls from the another exchange 241, but it may be considered to commonly use a part or whole, for both cases if the effects of the present invention are the same.

As above, according to the first embodiment of the present invention, in the above-described exchange, when the state approaches the state in which a restriction of incoming calls from another exchange is necessary, a part of the number of originating calls that can be accepted is given to the number of incoming calls that can be accepted, whereby the incoming calls from other exchange are accepted preferentially over the originating calls from the subscriber, resulting in an improvement in the efficiency of the communication network.

Second Embodiment

In the above-described first embodiment, a detection of a call from subscribers or from other exchanges is stopped when an abnormal congestion occurs, so that the load on the exchange can be greatly decreased. However, since the calls from the subscribers or other exchanges are not accepted at all for a predetermined period of time when there is abnormal congestion, services for subscribers are lowered during this period. Further, such a system as described in the first embodiment tends to effect an over restriction so that the ability of the exchange is suppressed without sufficient performance even when there are many communication requirements.

The second embodiment of the present invention intends to solve such problems in the first embodiment and has an object to provide a further improved originating call restriction system which can continue to defect calls from subscribers or other exchanges while decreasing the loads on the exchange even when there is abnormal congestion of the exchange, whereby the services can be improved.

Figure 7:
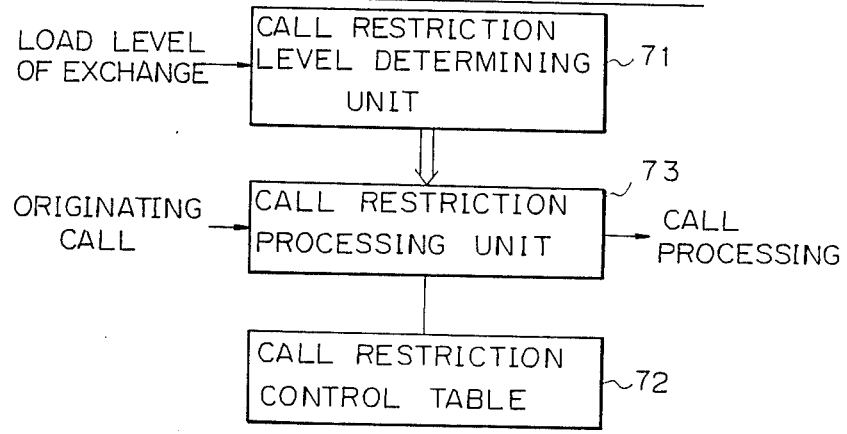
FIG. 7 is a diagram showing the principle of a second embodiment of the present invention.

FIG. 7 is a block diagram showing the principle of the second embodiment of the present invention.

In the exchange system according to the second embodiment of the present invention, as illustrated in the principal construction shown in FIG. 7, there is provided, in an electronic exchange, a call restriction level determining unit 71, a call control table 72, and a call restriction processing unit 73. These units and table 71 through 73 are provided in the originating call control part 131 or in the incoming call control part 231 shown in FIG. 6 of the first embodiment.

The call restriction level determining unit 71 is for determining the call restriction level in such a way that it is raised or lowered in accordance with whether a high load level should be continued or eliminated by making a determination of load level on the exchange at predetermined periods.

The call restriction processing unit 73 is connected to the call restriction table 2 for defining a number of calls that can be originated. The number of calls that can be originated can be changed in accordance with the call restriction level. The call restriction processing unit 73 reads a number of calls that can be originated from the call restriction table 72 and, by using the read number, carries out a call restriction process at predetermined periods shorter than the above-mentioned predetermined period for determining the call restriction level.

FIG. 8 is a diagram showing an example of the call restriction level control according to the second embodiment of the present invention. FIG. 9 is a diagram showing data used in the call restriction process for each call according to the second embodiment of the present invention. Referring to FIGS. 8 and 9, by the call restriction level determining unit 71, a call restriction level is determined in accordance with the load level of the exchange at predetermined periods. For the load level of the exchange, an access ratio of a processor in the electronic exchange, for example, is used. When the access ratio of the processor during a predetermined period T1 (for example 20 seconds) increases over a predetermined ratio a%, it is assumed that an abnormal congestion state exists, and unless the average access ratio during the predetermined period T1 decreases below a predetermined ratio b% (a>b), the abnormal congestion state is assumed to be continued so that the call restriction level is sequentially raised one by one. When the call restriction level reaches, for example level 4, it is kept at the level 4 even when the congestion state continues. On the other hand, when the average access ratio of the processor during the predetermined period T1 is decreased to be lower than b%, the call restriction level is sequentially decreased one by one.

The call restriction processing unit 73 has, in its memory, the call restriction table 72 for restricting the number of calls that can be originated and which changes in accordance with a high or low level call restriction level. The call restriction at a normal time and when there is abnormal congestion is carried out by the number of calls that can be originated. The number of calls that can be originated is determined to correspond to the call restriction level which is determined by the call restriction determining unit 71. During a normal load, a maximum of five originating calls can be processed in every predetermined period T2 (100 ms), and during abnormal congestion, the number of calls that can be processed is decreased in accordance with the raise in the call restriction level. At the level 2 for example, only up to one originating call can be processed for each predetermined period T2. Also, at the call restriction level 4, only one originating call is allowed for five T2 periods (500 ms) (see FIG. 10).

In this way, according to the second embodiment of the present invention, call detection can be continued even when there is abnormal congestion so that the services for the subscribers can be improved. Further, even when there is abnormal congestion, over restriction is not effected so that the ability of the exchange can be sufficiently put to practical use.

Figure 10:
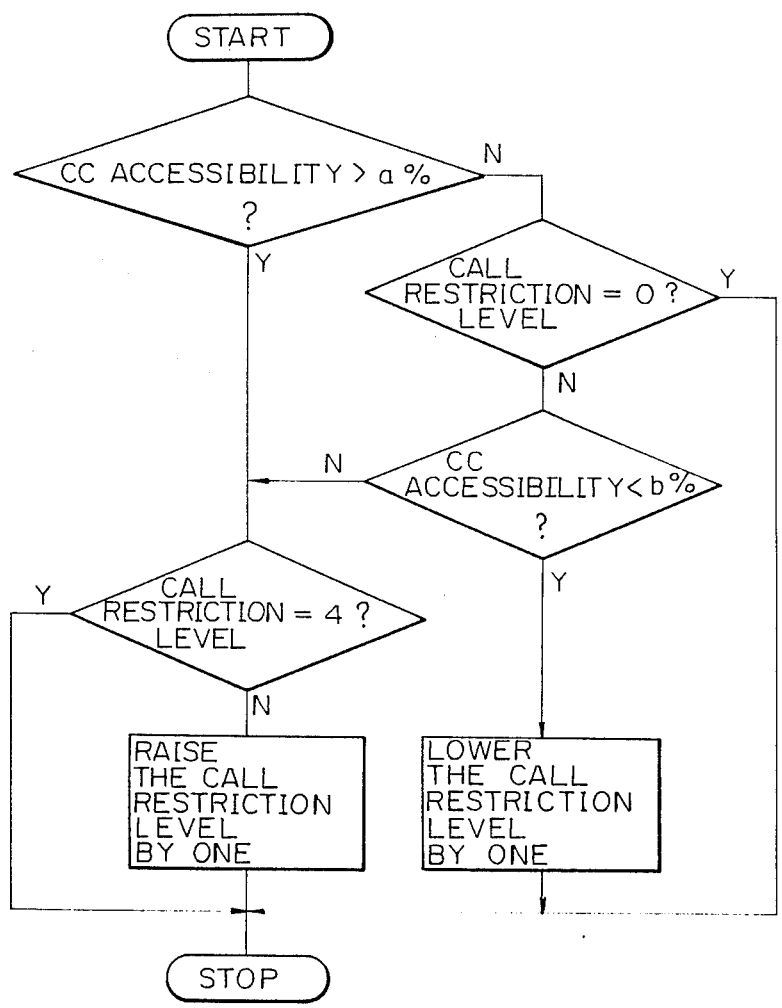
FIG. 10 is a flowchart explaining a call restriction level control according to the second embodiment of the present invention.

In the following, the originating call restriction system according to the second embodiment of the present invention is described in more detail. In the originating call restriction system in the second embodiment, the following two processes are of major importance:
(1) Control Process of the call restriction levels
(2) Restriction Process for Each Call at Each Call Restriction Level (1) Control Process of the Call Restriction Levels FIG. 10 is a flowchart showing a control process of call restriction levels in each period in the second embodiment of the present invention.

In the second embodiment, an abnormal congestion state is detected when the average rate of accessibility of the LPR 5 (see FIG. 1) during the predetermined period T1 (20 seconds) exceeds a predetermined rate a%. When the rate of accessibility exceeds a%, it is determined whether or not the call restriction level at that time is the level 4. If it is not level 4, the call restriction level is raised by one. If the call restriction level has already reached level 4, the level 4 is kept even if the abnormal congestion state continues.

When the rate of accessibility does not exceed a%, it is determined whether or not the call restriction level is zero. If it exceeds the level 0, it is further determined whether or not the rate of LPR accessibility reaches a predetermined ratio b% (b<a). If it exceeds b%, the same process as in the case when the rate of accessibility exceeds a% is carried out. On the other hand, when the rate of LPR accessibility is below b%, the call restriction level is lowered by one.

When the rate of accessibility is lower than a% and when the call restriction level at that time is 0, the call restriction level is not changed regardless of whether or not the rate of LPR accessibility exceeds b%.

Figure 11:
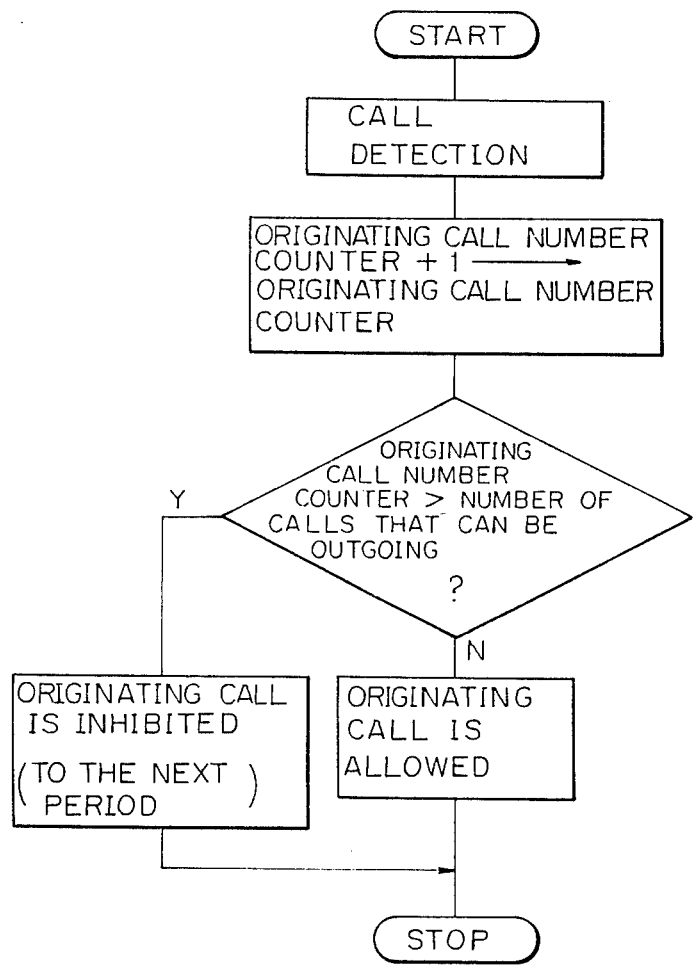
FIG. 11 is a flowchart explaining a call restriction process for each call according to the second embodiment of the present invention.

Referring to FIG. 8, the average rate of LPR accessibility and the call restriction levels determined based on the flowchart shown in FIG. 11 are shown. In the figure, $T1 = t_{i+1} - t_i$ represents a predetermined period (for example 10 seconds) for effecting the control, and marks . at the time $t_i$ represents the average rate of LPR accessibility during the time ($t_i$- $t_{i+1}$). The control of the call restriction levels is described in the following items (a) to (e) with reference to FIG. 8

(a) When a normal load state continues, the call restriction level is 0. At the call restriction level 0, a maximum of five call detections are possible for each subscriber line supervising period T2 (100 msec), according to the call restriction table shown in FIG. 9. When there are more than five originating calls within 100 msec, these excessive calls are processed as new processes in the next periods (after 100 msec).

(b) The LPR 5 calculates for each period T1 the average rate of LPR accessibility in the period. When the average rate of LPR accessibility exceeds a% at a time $t_1$, the LPR 5 raises the call restriction level from 0 to 1. In the control thereafter, two originating calls at the maximum can be detected and processed for each 100 msec.

(c) When an abnormal congestion state continues until a time $t_4$, the call restriction level at the time $t_4$ becomes the level 4. At the call restriction level 4, no originating call is detected and processed during four T2 periods (400 msec), and up to one originating call is detected and processed in the next fifth period.

(d) When the average rate of LPR accessibility at a time $t_5$ becomes lower than b% due to the restriction of originating calls during the time ($t_4$-$t_5$), the LPR lowers the call restriction level by one in the next period. Whereby, the call restriction level becomes 3.

(e) After this, such controls as above are repeated, and when the abnormal congestion state is eliminated, the call restriction level is set back to zero.

Note that the control of the call restriction level may be carried out by congestion states of various resources for processing exchange (such as call processing memory blocks, communication paths, signal receiving units, etc.).

(2) Restriction Process for Each Call at Each Call Restriction Level

FIG. 9 is a diagram showing data in the MM 22 (see FIG. 1) used for the restriction control for each call in an embodiment of the present invention, wherein 91 is an originating call number counter, 92 is a call restriction level pointer, 93 is a call restriction period pointer, and 94 is a call restriction table.

The originating call number counter 91 is for counting the number of originating calls, wherein it is incremented at each originating call detection, and it is cleared at each period T2 (100 msec).

The call restriction level pointer 92 is for indicating a call restriction level i at the current time, and the control is carried out by the call restriction control process for each above- mentioned period T1.

The call restriction period pointer 93 is for discriminating one of the call restriction periods j of T2×10, whereby it is updated in such a way as 1 → 2 → ... 10 → 1 → for each period. By referring to the call restriction table 94 by the use of the call restriction level pointer 92 and the call restriction period pointer 93, the number of originating calls that are allowable at each period can be determined uniquely.

In the call restriction table 94, the data representing the number of originating calls that are allowable at each call restriction period j at each restriction level i is described.

FIG. 11 is a flowchart showing a call process for each call in the second embodiment of the present invention. In the following, the process for each call in the present invention is described with reference to FIG. 11.

(1) The system increments the originating call number counter by one every time it detects a call.

(2) By using the restriction level pointer 92 and the restriction period pointer 93, the system reads from the call restriction table 94 the number of originating calls that can be originated in that period.

For example, when the restriction level pointer indicates the level 3, and when the restriction period pointer indicates the period 5, only up to one originating call is allowed for the period (100 msec).

(3) When the contents of the originating call number counter 91 is below the number of originating calls that are allowable, the originating call is allowed. When the contents of the originating call number counter 94 exceeds the number of originating calls that are allowable, the call is inhibited from being originated but is processed in the next period as a new call.

As described above, according to the second embodiment of the present invention, since the number of calls, that are capable of being processed in originating call detection within a predetermined time, is adjusted in accordance with the degree of load on the exchange, the originating call detection can be continued even in an abnormal congestion state so that the services for the subscribers are improved. Also, since over restriction does not take place when there is an abnormal congestion state, the ability of the exchange can be sufficiently used in practice.

Third Embodiment

Conventionally, to avoid the vicious cycle of such incomplete calls, it is known to be effective to introduce a LIFO queue to process first the last postponed queue when the resource becomes free, whereby the number of calls which have short postponement time is increased. In an overload state, to improve the processing efficiency in an exchange process, the LIFO logic has conventionally been employed taking into account the consumer's behavior (see for example, 10-th International Traffic Conference, Session 2.4, paper #5). In a conventional FIFO logic, in an overload state, the delay time in the process queue is increased so that all calls are delayed equally. As to consumers' behavior, there are tendencies of partial dialing in which the consumer dials without confirming the dial tone, abandoning a call before receiving a tone in which case the originating call is stopped after the delay of the dial tone, and a subscriber who waits for the dial tone patiently.

As the cause of the lowering of the processing efficiency of the exchanger, the generation of non-productive calls, i.e., ineffective calls, is considered. In particular, the probability of the generation of a non-productive call is high when the delay of the dial tone is more than 3 seconds.

To introduce the LIFO queue, however, it is necessary to solve the following problems (1) and (2).

Figure 13:
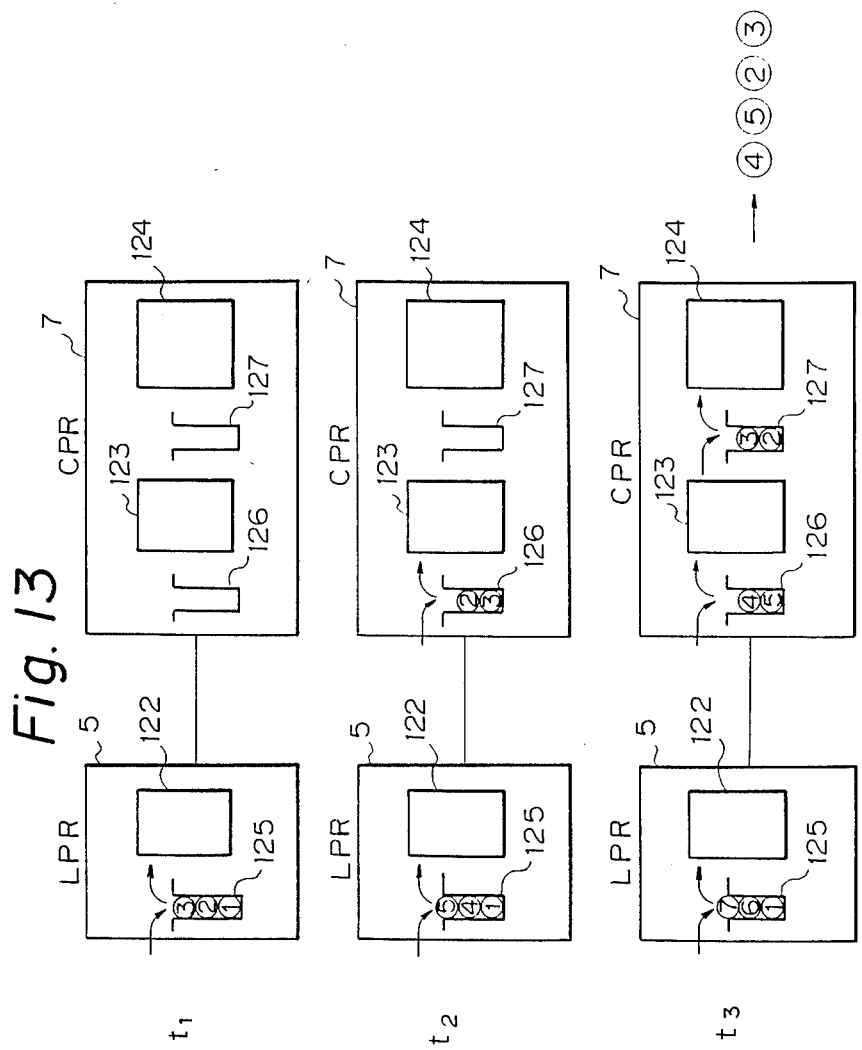
FIG. 13 is a diagram showing the sequence of taking out calls from the conventional LIFO queues shown in FIG. 12.

(1) When LIFO queues are provided for many types of resources, the LIFO sequence from an off-hook action by a subscriber to the reception of the dial tone, cannot be maintained when viewing the system as a whole, as will be seen from FIGS. 12 and 13 which explain the conventional LIFO arrangement.

In FIG. 12, a resource 122 is included in the LPR 5, and resources 123 and 124 are included in the CPR 7. Before the input of the resource 122, a LIFO 125 is provided for waiting for a hunting process from the resource 122. Before the input of the resource 123, a LIFO 126 is provided for waiting for a hunting process from the resource 123. Before the input of the resource 124, a LIFO 127 is provided for waiting for hunting process from the resource 124. In each LIFO detected calls are queued.

The conventional construction shown in FIG. 12 cannot maintain the LIFO sequence when viewing the system as a whole at the time of simultaneous congestion of the resources 122, 123, and 124. Namely, as shown in FIG. 13, it is assumed that, before a time t₁, calls ①, ②, and ③ are postponed in the LIFO 125 because of the congestion of the resource 121. After the time t₁, the calls 3 and 2 are taken out from the LIFO 125 in the sequence of ③→②. Then, before a time t₂, the calls ③ and ② are held in the LIFO 126 because of the congestion of the resource 123. Similarly, before a time t₃, the calls ② and ③ are held in the LIFO 127 because of the congestion of the resource 124, and the calls ⑤ and ④ are held in the LIFO 126 because of the congestion of the resource 123. After this, the calls are taken out from the CPR 7 in the sequence of ③→②→⑤→④ which is different from the LIFO sequence with respect to the first LIFO 125.

(2) In an electronic exchange system having a multiprocessor construction, the cases when the processor in which LIFO queues are provided, and a processor in which resources corresponding to the LIFO queues are accommodated, are different. In this case, it is essential to provide a LIFO queue control system in which the delay time of the communication between the processors is considered.

To aviate the above problems in the conventional LIFO structure, in the third embodiment, an improved LIFO queue structure is provided.

The object of the third embodiment of the present invention is to provide a system in which, in an electronic exchange system having a multiprocessor construction, the processes from an off-hook action by a subscriber to a dial tone connection, when there is congestion of various resources for exchange processes, can be effected in the LIFO sequence as a whole.

FIG. 14 is a diagram explaining the principal concept of the third embodiment of the present invention. In FIG. 14, a single LIFO 140 is provided only before the input of the resource 122. Namely, before the inputs of the other resources 123, 124, and 125, no LIFO is provided and the LIFO 140 is commonly used by the all resources in the system. By this construction, when one of the resources 122, 123 and 124 is not busy, calls are not taken out from the LIFO 140. Accordingly, the call sequence ④→③→②→① is maintained when the calls are taken out from the LIFO 140.

Figure 15:
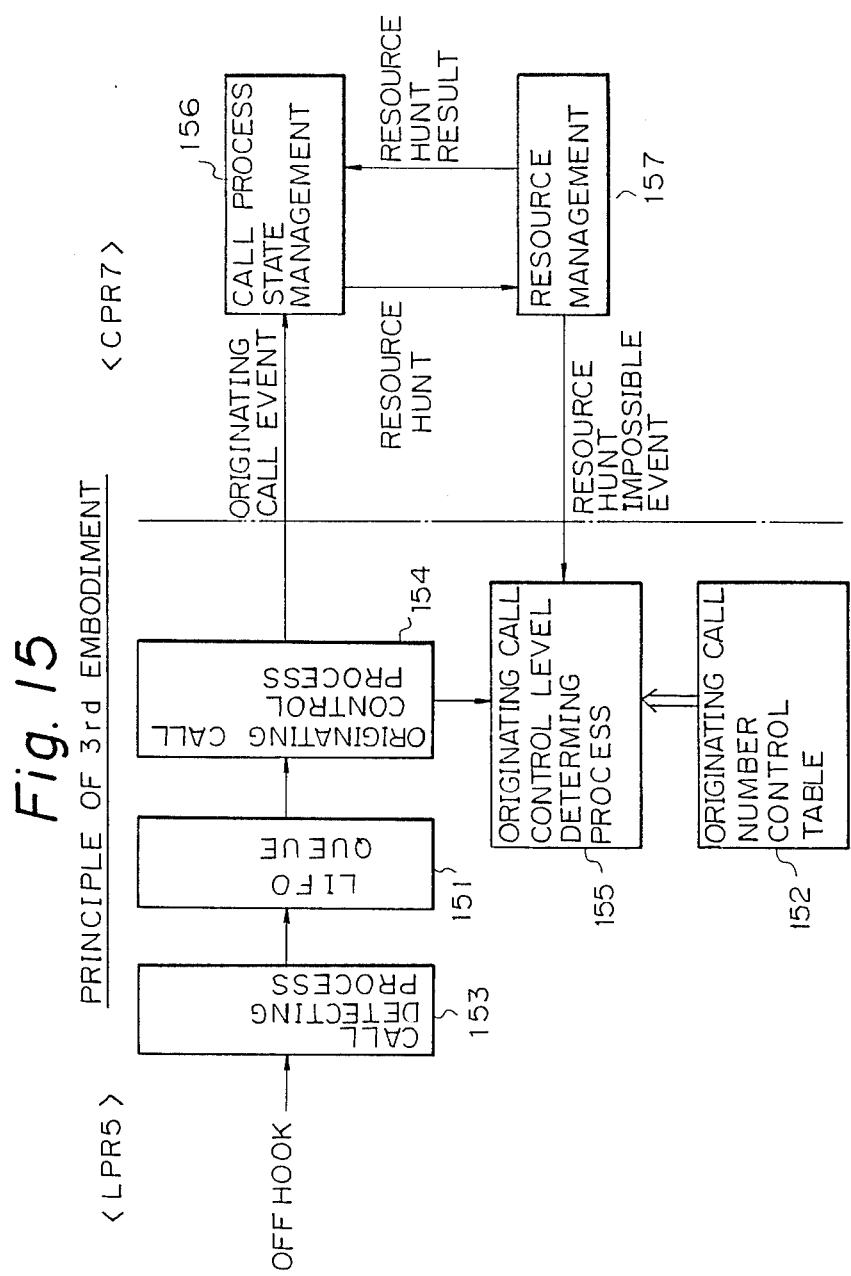
FIG. 15 is a diagram showing the principal construction of the exchange system according to the third embodiment of the present invention.

FIG. 15 is a diagram showing the principal construction of the third embodiment of the present invention, wherein the LPR 5 and the CPR 7 respectively represent processors provided in a line concentration stage and distributing stage, 151 is LIFO queue consisting of a LIFO buffer, and 152 is an originating call number control table.

The LPR 5 in the line concentration stage includes a part 153 for a call detecting process L1, a part 154 for a call controlling process L2, and a part 155 for a call control level determining process L3. The part 153 is the same as the originating call detecting part 121 or the incoming call detecting part 221 shown in FIG. 6. The part 154 and the part 155 are realized by the originating call controlling part 131 or the incoming call control part 231 shown in FIG. 6.

The CPR 7 in the distributing stage includes a part 156 for a management C1 of the call processing state and a part 157 for a resource management C2. The parts 156 and 157 are not disclosed in FIG. 6, but in actual practice, they are connected to the call processing part 132 in FIG. 6.

The LIFO queue 151 is provided between the call detecting process part 153 and the call controlling process part 154. This means that when the third embodiment is combined with the first embodiment, the LIFO queue 151 may be connected between the originating call detecting part 121 and the incoming call controlling part 131 or between the incoming call detecting part 221 and the incoming call control part 231 shown in FIG. 6.

In the call detecting process L1, an off-hook action of a subscriber is detected and calling events are registered in the originating call sequence into the LIFO queue 1.

Then, in the call control process L2, the number of originating calls that can be accepted is read at predetermined periods (100 ms) from the part 155 for the call control level determining process L3, and calling events within the number of originating calls that can be accepted are taken from the LIFO queue 151 to be sent to part 156 for the call processing state management C1.

In the call processing state management C1, the management of the states of terminals or services necessary for the exchange service are carried out, and a resource hunt is effected on the part 157 for the resource management C2.

In the part 157 for the resource management C2, idle/busy management of the resources necessary for the exchange service is carried out so that the resource hunt result is returned to the part 156 for the call process state management C1, and a resource hunt impossible event (resource hunt NG) is sent to the part 155 for a call control level determining process L3 at the time of resource congestion.

In the part 155 for the call control level determining process L3, by the resource hunt NG received from the CPR 7 and the timing process in its own process, a call control level is determined, whereby the number of originating calls that can be accepted to be transmitted to the part 154 for the call control process L2 is determined with reference to the originating call number control table 2.

The originating call restriction system in the third embodiment of the present invention carries out an originating call restriction at the time of congestion of resources for an exchange process as follows.

(1) The queue for postponing calls when various resources are congested is not provided in each resource but is provided commonly for the system in the processor for detecting an off-hook action of a subscriber, as a LIFO queue for postponing calls when resources used during the period between an off-hook action of a subscriber to a transmission of a dial tone.

(2) When congestion of resources is detected, a message indicating a resource hunt cannot be transmitted to the processor in which the LIFO queue is provided. When the processor in which the LIFO queue is provided receives this message, it stops taking out calls from the LIFO queue for a short time (the time when the congestion of the resources is expected to be removed). Thus, during this short period, even when a new originating call is generated, taking out of any calls from the LIFO queue is inhibited.

(3) After the above-mentioned time for stopping of taking out of calls from the LIFO queue has passed, taking out of calls from the LIFO queue is restarted at a lower rate of calls from the LIFO queue than when the congestion of the resources was first encountered. After this, if a new congestion of resources does not occur for a predetermined period, the rate of the calls taken out will be returned step by step to that before the detection of the resource congestion.

By effecting such an originating restriction, the process from an off-hook action by a subscriber, to a dial tone connection when there is congestion of various resources for exchange processes, is effected in the LIFO sequence, so that the system throughout at the time of overload can be improved.

The background of the exchange system of the third embodiment is also shown in FIG. 1.

In such a system as shown in FIG. 1, typical resources, which may cause congestion of resources during an over load, during the period from a detection of a call to the connection of the dial tone, are considered as follows:

① a communication channel (SLT) 1 between the line concentration stage and the distribution stage;

② distribution stage call control memory block (CCB) in the main memory (MM) 21;

③ distribution stage switching network path (DSM) 6; and

④ PB signal receiving unit (PBREC) 18.

In the third embodiment, by providing the LIFO queue 153 in the LPR 5, calls are postponed by means of the LIFO queue 153 in the LPR 5 during the above-mentioned resource congestion so that originating calls are restricted by the congestion of resources.

The originating call restriction during the resource congestion according to the third embodiment of the present invention is described in more detail with reference to FIGS. 16 to 19 as follows.

(1) Taking Out Process From the LIFO Queue 151 in the LPR 5

Figure 16:
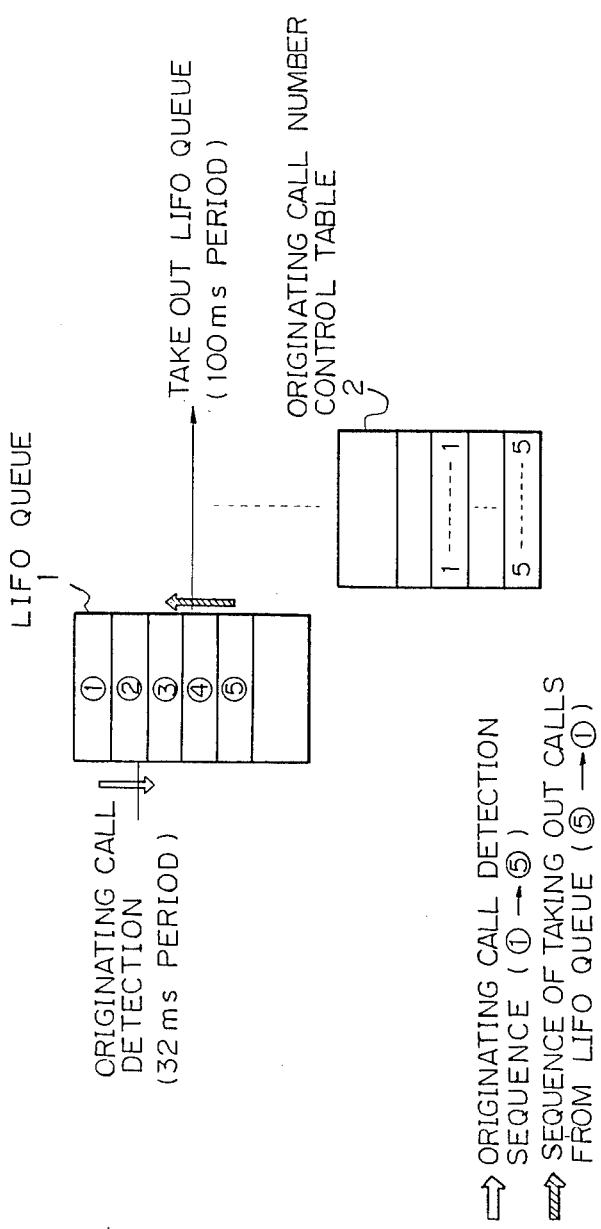
FIG. 16 is a diagram explaining a process of taking out calls from a LIFO queue in a third embodiment of the present invention.

FIG. 16 is a diagram showing a taking out process of calls from the LIFO queue 151 provided in the LPR 5. In FIG. 16, when call detections are effected by the call detecting process L1 with 32 ms period, the call requests are once stored in the LIFO queue 151 according to the detected sequence ① to ⑤. The call requests stored in the LIFO queue 151 are then taken out therefrom in the sequence from the last input call, for example ⑤ to the first input call ①. Note that the number of calls that can be taken out from the LIFO queue 153 is the number of calls that can be allowed which is described in the originating call number control table 152.

(2) Contents of the Outgoing Call Number Control Table

Figure 17:
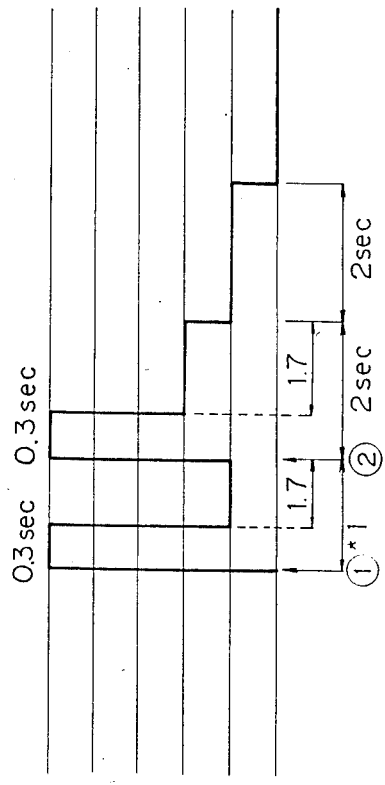
FIG. 17 is a diagram explaining contents of a table in the third embodiment.

FIG. 17 is a diagram showing the contents of the originating call number control table 152 of in the third embodiment of the present invention. The difference between FIG. 9 and FIG. 17 is that, in FIG. 17, a call inhibit level and important calls are provided which ar not provided in FIG. 9 of the second embodiment.

In FIG. 17, the originating call number control table 152 shows the number of calls that can be taken out at 100 ms intervals from the LIFO queue 151. In the example of FIG. 17, it is illustrated that, at each 100 ms interval, five calls at the level 0, two calls at the level I, and one call at the level II can be taken out from the LIFO queue 151. In the figure, the mark * represents the number of calls by important subscribers that can be taken out from. the LIFO queue 151. For the important subscribers, at the call restriction level II for example, one call can be taken out at each 200 ms interval; and at the call restriction level III for example, one call can be taken out at each 400 ms interval.

The originating call number control table 152 includes six levels to be able to control step by step the number of calls to be taken out, each control level being classified as follows.

Inhibit level: This is used for temporarily stopping taking out calls for a predetermined time when the degree of congestion is relatively large. In this level, only one call from an important subscriber is allowed to be taken out from the LIFO queue 151 at each 800 ms interval.

Levels I to IV: These levels are used depending on the degree of congestion. Namely, after release from the inhibit level, the take out rate is selected depending on the degree of congestion.

Level 0: This is used in a normal state when the resources are not in a state of congestion.

Also in FIG. 17, n (n=1, 2, ..., or 5) represents the number of calls taken out when both normal calls and important calls are taken out, and n* represents the number of calls taken out when only originating calls from important subscribers are taken out.

(3) Processes When Resources are Busy (Congestion)

Figure 18:
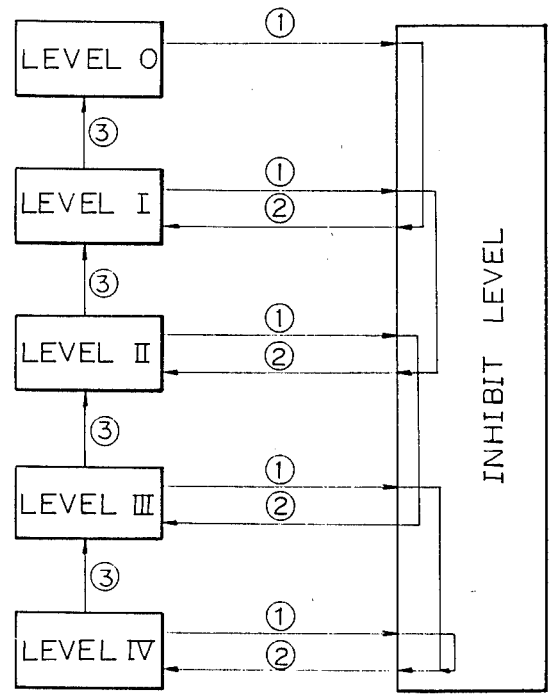
FIG. 18 is a diagram explaining state transitions in originating call control level determination in the third embodiment.

FIG. 18 is a diagram showing a state transition in the determination of a call restriction level. Referring to FIG. 18, the processes when the resources are congested are described.

① When the resources in the CPR 7 side (typical examples are SLT 1, DSM 6, CCB in the MM 21, and PBREC 18 as described before) encountered congestion, a resource hunt impossible event (hereinafter referred to as a resource hunt NG) is transmitted from the CPR 7 to the LPR 5.

②  In the LPR 5, when the resource hunt NG is received, the state moves to the call inhibit level to stop taking out calls from the LIFO queue 151 for 300 ms. But, even in the call inhibit level, to preferentially processes calls from important subscribers when there is an overload, only one originating call from an important subscriber is taken out from the LIFO queue 151 at every 300 ms interval. The last-in call from an important subscriber can be easily found in the LIFO queue 151 by the use of conventional technology. The resource hunt NGs receives during this call inhibit period are ignored because they are caused by delays of communication between the CPR 7 and the LPR 5.

③ After the 300 ms of the call inhibit level, the state moves to a call restriction level higher by one than the previous call restriction level. For 1.7 seconds from the receiving of a resource hunt NG after 300 ms has passed, the taking out of a call from the LIFO queue 151 is carried out at a call restriction level higher by one than the previous call restriction level, so as to decrease the number of calls taken out from the LIFO queue 151. If a resource hunt NG is received even at this high restriction level, the state moves again to the call inhibit level and then, after 300 ms, the state moves to a higher restriction level to limit the number of calls to be taken out from the LIFO queue 151.

In FIG. 18, ① represents the transition of the state from one of the call restriction levels 0 to IV to the call inhibit level when a resource hunt NG is received, ② represents the transition of the state from the call inhibit level to one of the call restriction levels 0 to IV higher by one level than the previous level after 300 ms in the state at the call inhibit level, and ③ represents the transition of the state from one of the call restriction levels 0 to IV to the call restriction level lower by one than the previous level. Namely, when the call restriction level before receiving the resource hunt NG is i, the returned level after the time out of 300 ms will be i+1.

By continuing such processes as above, the system can more to the optimum call restriction level that the system can process.

FIG. 19 shows an example of the transition of the call restriction level with respect to the number of originating calls. In FIG. 19, at first the state is at the call restriction level 0. At the timing ①, a CPR resource hunt NG is received by the line concentration stage processor LPR. The state then moves to the call inhibit state. After 300 ms from the timing ①, the state moves from the call inhibit state to the call restriction state I which is higher by one than the previous call restriction level 0. Similarly, at the timing ② after 2 seconds from the timing ①, a CPR resource hunt NG is again received by the line concentration stage processor LPR. The state then moves to the call inhibit state. After 300 ms from the timing ②, the state moves from the call inhibit state to the call restriction state II which is higher by one than the previous call restriction level I. After 2 seconds from the timing ②, since no resource hunt NG is received, the call control level is lowered to the level I which is lower by one than the previous level II.

The operations of the system shown in FIG. 15 are described in more detail with reference to the flow-charts shown in FIGS. 20 to 25.

Figure 20:
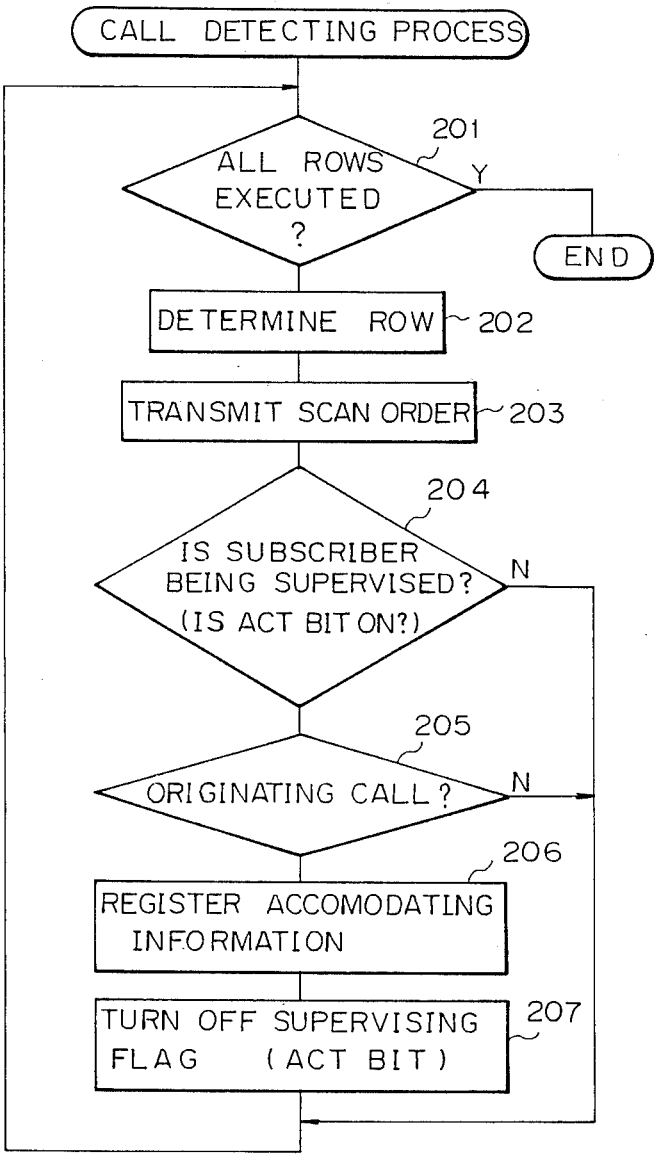
FIG. 20 is a flowchart explaining the call detecting process L1 in the third embodiment.

FIG. 20 is a flowchart explaining the call detecting process in the part 153. In FIG. 20, it is assumed that a scan memory in the LCNW 4 (see FIG. 1) stores state information of the subscribers accommodated by the exchanger. The state information is stored in a plurality of rows in the scan memory. In each of the rows, the state information of for example 32 subscribers is stored. The process shown in FIG. 20 is repeated at 32 ms intervals. At step 201, it is discriminated whether or not all the rows in a scan memory have been scanned to detecting a call. If so, the call detecting process in this period is ended. If not, at step 202, the row to be scanned in this cycle is determined. Then, at step 203, a scanning order is transmitted from the LCR 5 to the scan memory in the LCNW 4 so as to scan the row. Then, at step 204, a discrimination is made of whether or not the subscribers on the row are under supervision. If an ACT bit, i.e., a supervising flag in the row, is ON, the corresponding subscriber is determined as under supervision. With respect to the subscriber under supervision, when an off-hook action is detected at step 205, the accommodating location information of the subscriber is registered at step 206 in the LIFO queue 151. Then, at step 207, the supervising flag (ACT bit) of the corresponding subscriber is turned off. After this, the transition of the state of the line of the above-mentioned subscriber is ignored.

Figure 21:
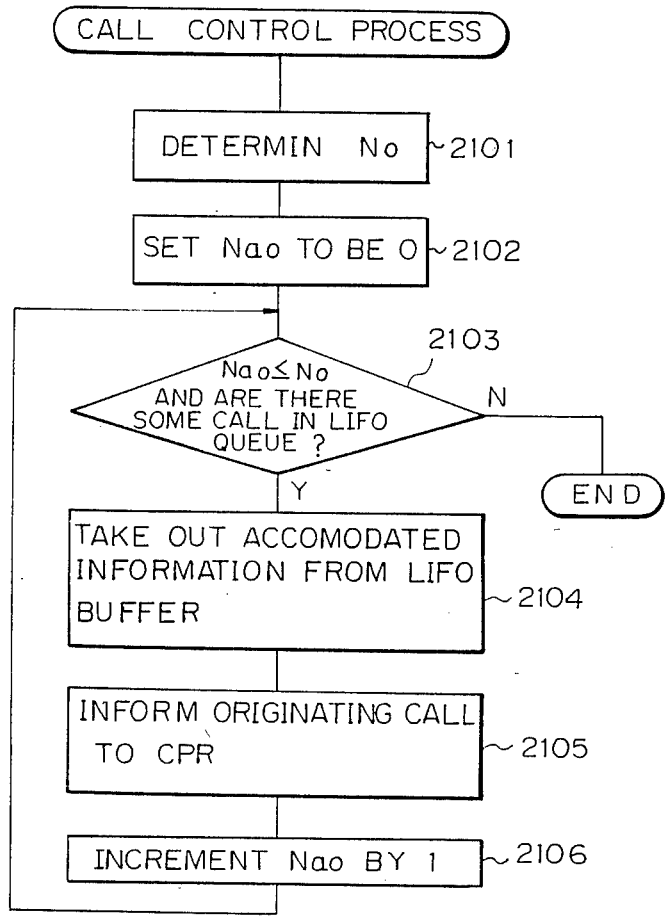
FIG. 21 is a flowchart explaining the call control process in the third embodiment.

FIG. 21 is a flowchart explaining the call control process L2. In FIG. 21, at step 2101, the number $N_o$ of originating calls that can be accepted is determined. Then, at step 2102, the number $N_{ao}$ of the originating calls is set to be zero. At step 2102, a comparison is made between the number $N_{ao}$ of the originating calls in accepted from the LIFO queue 151 and the number $N_o$ of originating calls that can be accepted, or a discrimination is made of whether there are some calls in the LIFO quene 151. If the number $N_{ao}$ is smaller than the number $N_o$ or if there are some calls in the LIFO queue 151, at step 2103, the accommodating location information (a call event) of the subscriber is taken out from the LIFO queue 151. Then, at step 2105, the originating call events is informed to the CPR 7. At step 2106, the number $N_{ao}$ is incremented by one. The steps 2103 to 210 are repeated as long as the number $N_{ao}$ is smaller than the number $N_o$.

Figure 22:
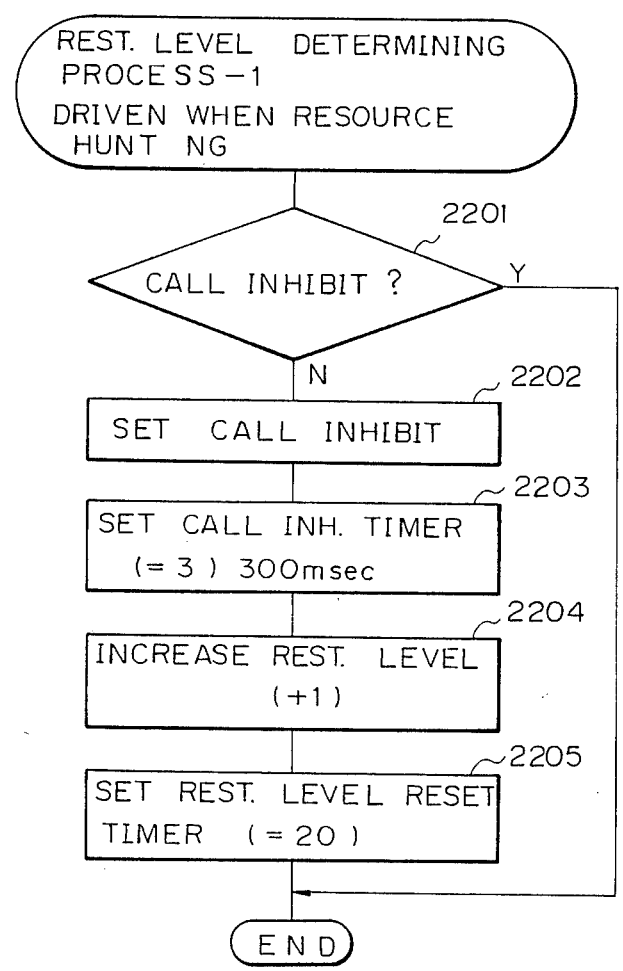
FIG. 22 is a flowchart explaining an example of the restriction level determining process in the third embodiment.

FIG. 22 is a flowchart explaining a part 1 of the call restriction level determining process L3. In FIG. 22, this process is driven when a resource hunt NG is given from the CPR 7. Namely, when the originating call restriction flag $F_o$ is given from the part 145 for instructing originating call restriction to the originating call control part 131 shown in FIG. 6, the process shown in FIG. 22 is followed. It is assumed that the LPR 5 includes a call inhibit flag, a call inhibit reset timer, a call restriction level, and a call restriction level reset timer. When a resource hunt NG is received from the CPR 7, it is discriminated whether or not the call inhibit flag is ON. If not, at step 2202, the call inhibit flag is set. Then, at step 2203, the call inhibit timer is set to 3 so as to continue the call inhibit level for 300 ms. Then, at step 2204, the call restriction level is increased by one. Finally, at step 2205, the call restriction level reset timer is set to 20 so as to continue the call restriction level set in the step 2204 for 2 seconds.

Figure 23:
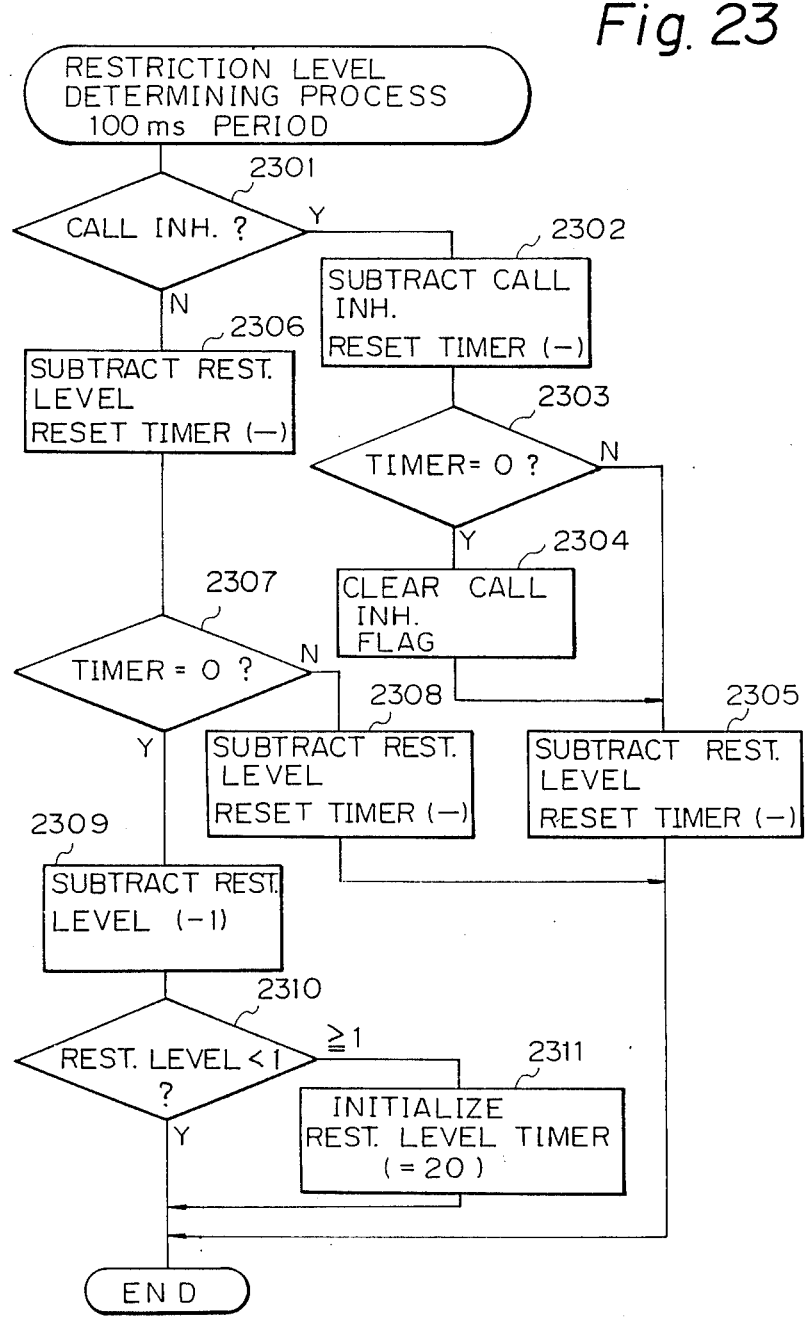
FIG. 23 is a flowchart explaining another example of the restriction level determining process in the third embodiment.

FIG. 23 is a flowchart explaining a part 2 of the call restriction level determining process L3. This process is repeated at every 100 ms. In FIG. 23, when the call inhibit flag is ON at step 2301, one is subtracted from the call inhibit reset timer to indicate that the 100 ms has passed in this process. Then, when the call inhibit reset timer is zero at step 2303, this means that the 300 ms has passed in the call inhibit state so that at step 2304, the call inhibit flag is cleared. At step 2303, if the timer is not zero, or after the step 2304, then at step 2305 one is subtracted from the call restriction level reset timer. Then, the 100 ms process of reaches the end.

Figure 24:
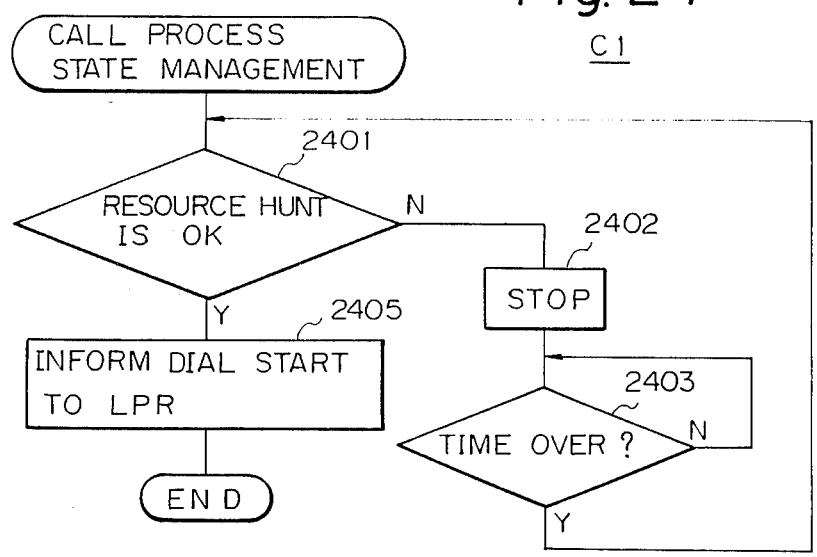
FIG. 24 is a flowchart explaining the call process state management in the third embodiment.

At step 2301, if the call inhibit flag is not ON, then at step 2306, one is subtracted from the call restriction level reset timer (max is 20). Then, at step 2307, if the call restriction level reset timer is not zero, then at step 2308 one is subtracted from the call restriction level reset timer. At step 2307, if the call restriction level reset timer is zero, this means that the call restriction level determined in the step 2204 in FIG. 22 continued for 2 seconds so that the call restriction level is decreased by one at step 2309. Then, at step 2310, if the call restriction level is larger than or equal to 1, the call restriction level reset timer is initialized to 20 so as to continue the new call restriction level state for 2 seconds. After the step 2310 or 2311, the process reaches the end. FIG. 24 is a flowchart explaining a part of the operation of the call processing state management C1, namely, from an originating call to a dial tone transmission. This process is driven by the LPR 5. At step 2401, it is discriminated whether or not a resource hunt is possible. If a resource hunt NG is informed to the LPR 5, then at steps 2402 and 2403, the taking out of a call from the LIFO queue 151 is stopped for a predetermined time. If the resource hung is OK, at step 2405, a dial start requirement is informed to the LPR 5 and this process reaches the end.

Figure 25:
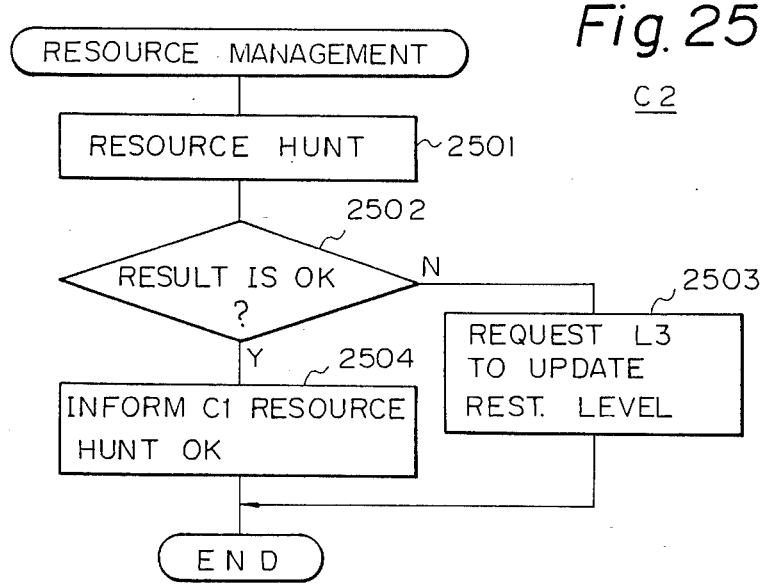
FIG. 25 is a flowchart explaining the resource management in the third embodiment.

FIG. 25 is a flowchart explaining the operation of the resource management C2. At step 2501, a resource hunt is executed. If the resource hunt does not succeed at step 2502, then at step 2503, the CPR 7 requests the part 155 for the call control level determining process L3 to update the call restriction level. If the resource hunt at the step 2501 succeeds, it is informed to the part 156 for the call processing state management C1 that the hunt was OK. After the step 2503 or 2504, this process goes to the end.

As described in the foregoing, according to the third embodiment of the present invention, in an electronic exchange system constructed by multi processors, since the originating call restriction is carried out by providing a LIFO queue in the LPR, the processes from an off hook by a subscriber to a dial tone connection can be carried out in the LIFO sequence even when various resources for exchange processing occur, so that the system throughput when there is an overload can be improved.

From the foregoing description, it will be apparent that, according to the present invention, an improved exchange system having a call restriction function, which can accept with priority incoming calls from other exchanges which occupy more resources than the originating calls from the accommodated subscribers, which enables continuing call detections from subscribers even when there is abnormal congestion of the resources, and in which the processes from an off-hook action to a dial tone can be effected in the LIFO sequence, whereby the services for the customers are improved.

We claim:

1. An exchange system having an originating call restriction function for restricting originating calls when the number of originating calls exceeds a predetermined process restricting value within a predetermined period, comprising:
   means for counting originating calls;
   means for counting incoming calls;
   storing means for storing a number ($N_o$) of originating calls that can be accepted from accommodated subscribers (111) within a predetermined period;
   storing means for storing a number ($N_i$) of incoming calls that can be accepted within a predetermined period; and
   means for correcting the number of calls that can be accepted, by comparing said number ($N_i$) of incoming calls that can be accepted with a number ($N_{ai}$) of accepted incoming calls, and when the difference between said number ($N_i$) of incoming calls that can be accepted and said number ($N_{ai}$) of accepted incoming calls is decreased below a predetermined value, by decreasing said number ($N_o$) of originating calls that can be accepted by a predetermined correcting value ($\alpha$), and by increasing said number ($N_i$) of incoming calls that can be accepted by said correcting value ($\alpha$);
   whereby, when there is processing congestion, the incoming call restriction level is relaxed and the originating call restriction level is increased.

2. An exchange system having an originating call restriction function as claimed in claim 1, wherein said incoming calls are those incoming from another office through a communication line (212).

3. An exchange system having an originating call restriction function as claimed in claim 1, wherein said congestion of processes is determined by the number of calls.

4. An exchange system having an originating call restriction function as claimed in claim 1, wherein said congestion of processes is determined by the processing ability of a control unit in said exchange.

5. An exchange system having an originating call restriction function as claimed in claim 1, wherein said restriction of originating calls in controlled step by step in accordance with the processing ability.

6. An exchange system having an originating call restriction function as claimed in claim 1, wherein a plurality of originating restriction levels are provided and said control of said originating call restriction is carried out by the use of said plurality of levels.

7. An exchange system having an originating call restriction function as claimed in claim 6, wherein said restriction levels comprise two levels, and once a restriction process is started, the restriction is continued to the lower restriction level.

8. An exchange system having an originating call restriction function as claimed in claim 3, wherein said number ($N_o$) of originating calls that can be accepted is variable in accordance with the restriction level.

9. An exchange system having an originating call restriction function as claimed in claim 8, wherein when the number of counted originating calls exceeds a predetermined restriction level, the restriction level is raised step by step, and when the number of counted originating calls decreases to be lower than the predetermined level, the restriction level is lowered step by step.

10. An exchange system having an originating call restriction function as claimed in claim 1, wherein said originating call restriction and said incoming call restriction are carried out in accordance with importance of calls.

11. An exchange system having an originating call restriction function as claimed in claim 1, wherein said restriction of the incoming calls is controlled step by step in accordance with processing ability.

12. An exchange system having an originating call restriction function as claimed in claim 11, wherein a plurality of incoming restriction levels are provided and said control of said incoming call restriction is carried out by the use of said plurality of levels.

13. An exchange system having an originating call restriction function as claimed in claim 12, wherein said restriction levels comprise two levels, and once a restriction process is started, the restriction is continued to the lower restriction level.

14. An exchange system having an originating call restriction function as claimed in claim 12, wherein said congestion of processes is determined by the number of calls.

15. An exchange system having an originating call restriction function as claimed in claim 14, wherein when the number of counted incoming calls exceeds a predetermined restriction level, the restriction level is raised step by step, and when the number of counted incoming calls decreases to be lower than the predetermined level, the restriction level is lowered step by step.

16. An exchange system having an originating call restriction function as claimed in claim 1, wherein said originating call detection processing part comprises an LIFO means, whereby said originating calls are queued in the queue of said LIFO means.

17. An exchange system having an originating call restriction function as claimed in claim 16, wherein said restriction of originating calls is controlled step by step in accordance with processing ability.

18. An exchange system having an originating call restriction function as claimed in claim 17, wherein a plurality of originating restriction levels are provided and said control of said originating call restriction is carried out by the use of said plurality of levels.

19. An exchange system having an originating call restriction function as claimed in claim 18, wherein said restriction levels comprise two levels, and once a restriction process is started, the restriction is continued to the lower restriction level.

20. An exchange system having an originating call restriction function as claimed in claim 16, wherein when resources are congested, taking out of calls from said LIFO means is stopped and the restriction level is raised by one; when the resources are congested again, taking out of calls from said LIFO means is stopped and the restriction level is raised by one, and the above processes are sequentially moved up to N levels.

21. An exchange system having an originating call restriction function in an exchange (1) for determining a number ($N_o$) of accepted originating calls that can be originated from accommodated subscribers (111) within a predetermined period, and a number ($N_i$) of accepted incoming calls that can be incoming within a predetermined period from another exchange (211) connected through a transmission line (211), and when a number ($N_{ao}$) of originating calls called and accepted within a predetermined period from said subscribers (111) increases to more than said number ($N_o$) of accepted originating calls that can be originated, the calls from said subscribers (111) are restricted, and when a number ($N_{ai}$) of accepted incoming calls incommed within a predetermined period from said another exchange (211) increases more than said number ($N_i$) of incoming calls that can be accepted, the calls received from said another exchange (211) are restricted;

characterized in that a call number correcting means (55) is provided whereby said number ($N_i$) of accepted calls that can be incoming is compared with said number ($N_{ai}$) of accepted incoming calls, and when the difference between said number ($N_i$) of accepted calls that can be incoming and said number ($N_{ai}$) of incoming calls is decreased below a predetermined value, said number ($N_o$) of accepted calls allowable to be accepted is decreased by a predetermined correction call number ($\alpha$), and said number ($N_i$) of receiving calls allowable to be accepted is increased by said correction call number ($\alpha$).

22. An exchange system having an originating call restriction function as claimed in claim 21, further comprising:

call restriction level determining means (71) for determining a call restriction level in such a way that it is raised or lowered in accordance with the state of whether a high load level should be continued or eliminated by making a determination of load level of said exchange at every predetermined period; and call restriction processing means (73) comprising a call restriction table (72) for defining a number of call that can be originated which changes in accordance with said call restriction level, for effecting a call restriction process at every predetermined period shorter than said predetermined period by the number of cells that can be originated read from said call restriction table in accordance with the call restriction level determined by said call restriction level determining means (71).

23. An exchange system having an originating call restriction function as claimed in claim 21, comprising multiprocessor construction having processors (LPR, CPR) in a line concentration stage and in line distribution stage, respectively, and being provided with:

a LIFO queue (151) for postponing a call in the processor (LPR) in said line concentration stage, and an originating call number control table (152) for determining the number of originating calls that are allowable within a predetermined period;

the taking out of an originating requirement from said LIFO queue (151) is stopped for a predetermined time when there is congestion of resources for exchange processings; and the number of calling requirements taken out from said LIFO queue (151) is increased step by step in accordance with control levels in said originating call number control table (152) after said predetermined time.

* * * * *